US008121427B2

(12) United States Patent
Tian et al.

(10) Patent No.: US 8,121,427 B2
(45) Date of Patent: Feb. 21, 2012

(54) BREAKPOINT DETERMINING FOR HYBRID VARIABLE LENGTH CODING AND ENCODING THE DETERMINED BREAKPOINT

(75) Inventors: Dihong Tian, San Jose, CA (US); Pi Sheng Chang, San Jose, CA (US); Wen-hsiung Chen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 997 days.

(21) Appl. No.: 11/961,795

(22) Filed: Dec. 20, 2007

(65) Prior Publication Data

US 2008/0170613 A1   Jul. 17, 2008

Related U.S. Application Data

(60) Provisional application No. 60/885,075, filed on Jan. 16, 2007.

(51) Int. Cl.
*G06K 9/36* (2006.01)
*H03M 7/34* (2006.01)

(52) U.S. Cl. ............................ 382/245; 341/51; 382/239

(58) Field of Classification Search ............ 375/E7.144; 382/245, 239; 341/51
See application file for complete search history.

(56) References Cited

U.S. PATENT DOCUMENTS

| 4,698,672 | A | 10/1987 | Chen et al. | 358/136 |
| 4,821,119 | A | 4/1989 | Gharavi | 375/240.16 |
| 5,640,420 | A | 6/1997 | Jung | 375/240 |
| 5,751,232 | A | 5/1998 | Inoue et al. | 341/63 |
| 7,203,372 | B1 | 4/2007 | Chen et al. | 382/244 |
| 7,212,681 | B1 | 5/2007 | Chen et al | 382/248 |
| 7,242,328 | B1 | 7/2007 | Chen et al. | 375/240 |
| 2004/0228540 | A1 | 11/2004 | Chen et al. | 382/246 |
| 2005/0013376 | A1 | 1/2005 | Dattani et al. | |
| 2005/0276487 | A1 | 12/2005 | Chen et al. | 382/232 |
| 2005/0276497 | A1 | 12/2005 | Chen et al. | 382/245 |
| 2005/0276498 | A1 * | 12/2005 | Chen et al. | 382/245 |
| 2005/0276499 | A1 | 12/2005 | Wu et al. | 382/245 |
| 2006/0039615 | A1 | 2/2006 | Chen et al. | 382/232 |
| 2006/0039616 | A1 | 2/2006 | Chen et al. | 382/232 |
| 2006/0039620 | A1 | 2/2006 | Chen et al. | 382/245 |
| 2006/0039621 | A1 | 2/2006 | Toebes et al. | 382/245 |
| 2006/0056720 | A1 | 3/2006 | Chen et al. | 382/245 |
| 2007/0019877 | A1 | 1/2007 | Chen et al. | 382/245 |

OTHER PUBLICATIONS

U.S. Appl. No. 11/686,898, filed Mar. 15, 2007.

(Continued)

*Primary Examiner* — Seema S Rao
*Assistant Examiner* — Wanda Russell
(74) *Attorney, Agent, or Firm* — Dov Rosenfeld; Inventek

(57) ABSTRACT

A method, and apparatus, and logic encoded in one or more computer-readable tangible medium to carry out a method of determining a breakpoint position in an ordered sequence of quantized transform coefficients of a block of image data for a hybrid variable length coding the ordered sequence. The breakpoint location in the sequence is between a low-frequency region and a high-frequency region. The hybrid variable length coding method includes coding the low-frequency region using a selected low-frequency variable length coding method; coding the high-frequency region using a selected high-frequency variable length coding method; and coding the position in the sequence of the breakpoint. The breakpoint location is determining uses a relatively simple and fast method based on pre-defined cost criteria. A method is included that instead of coding the breakpoint separately, codes the breakpoint jointly with coefficient events.

20 Claims, 9 Drawing Sheets

OTHER PUBLICATIONS

U.S. Appl. No. 11/686,860, filed Mar. 15, 2007.
U.S. Appl. No. 11/686,778, filed Mar. 15, 2007.
U.S. Appl. No. 11/686,778, filed Mar. 15, 2007, Office Action Mailing Date Sep. 1, 2010.

Cuenca et al: "Breakpoint Tuning in DCT-Based Nonlinear Layered Video Codecs", 2004, EURASIP Journal on Applied Signal Processing, pp. 2555-2570.

* cited by examiner

| Index  | 0 | 1 | 2 | 3 | 4 | 5 | 6 | 7 | 8 | 9 | 10 | 11 | 12 | 13 | 14 | 15 | 16 | 17 | ... |
|--------|---|---|---|---|---|---|---|---|---|---|----|----|----|----|----|----|----|----|-----|
| Amplit.|   | 0 | 8 | 5 | 2 | 0 | 3 | 2 | 3 | 0 | 0  | 1  | 0  | 0  | 0  | 1  | 0  | (all 0) |

BREAKPOINT DETERMINING FOR HYBRID VARIABLE LENGTH CODING AND ENCODING THE DETERMINED BREAKPOINT

The present invention claims priority of and is a conversion of U.S. Provisional Patent Application No. 60/885,075 filed Jan. 16, 2007 to inventors Tian et al., titled Breakpoint Determining for Hybrid Variable Length Coding. The contents of such U.S. Application No. 60/885,075 are incorporated herein by reference.

The present invention is also related to U.S. application Ser. No. 11/686,778 to inventors Tian et al. titled PER BLOCK BREAKPOINT DETERMINING FOR HYBRID VARIABLE LENGTH CODING, filed 15 Mar. 2007, referred to as the Per Block Breakpoint Determining Patent Application hereinafter, and disclosing breakpoint determining methods called "per block breakpoint determining methods" herein. The present invention is also related to U.S. application Ser. No. 11/686,860 to inventors Tian et al. titled PER MULTI-BLOCK PARTITION BREAKPOINT DETERMINING FOR HYBRID VARIABLE LENGTH CODING, filed 15 Mar. 2007 to inventors Tian et al, referred to as the Per Multi-Block Breakpoint Determining Patent Application hereinafter, and disclosing breakpoint determining methods called "per multi-block breakpoint determining methods" herein. The present invention is also related to U.S. application Ser. No. 11/686,898 to inventors Tian et al. titled BREAKPOINT DETERMINING FOR HYBRID VARIABLE LENGTH CODING USING RELATIONSHIP TO NEIGHBORING BLOCKS filed 15 Mar. 2007, referred to as the Context-Based Breakpoint Determining Patent Application hereinafter, and disclosing breakpoint determining methods called "context-based breakpoint determining methods" herein. The contents of each such U.S. Application are also incorporated herein by reference.

FIELD OF THE INVENTION

The present disclosure is related generally to image compression and video compression.

BACKGROUND

Modern transform-based image compression methods include transforming blocks of image data, quantizing the transform coefficients, ordering the coefficients along a path in the two-dimensional coefficient plane, and entropy coding the ordered sequence of quantized coefficients. Quantization is such that 0 is the most-likely-to-occur coefficient amplitude. Conventional two-dimensional variable length coding is commonly used in image and video compression for the entropy coding, and includes coding the position of each non-zero-value coefficient and its amplitude simultaneously as a pair, which typically results in a shorter average code length than coding the position and amplitude separately. In a block-based transform coding, however, there are often a number of consecutive non-zero-value coefficients along a low-frequency region of the coding path. Instead of using a single code to represent the "n" consecutive coefficients, conventional two-dimensional variable length coding requires "n" separate codes, which is inefficient. Hybrid variable length coding was recently introduced and includes coding a first region in the ordered sequence—the low-frequency region—differently than the coefficients in a second higher-frequency region. One embodiment of hybrid variable length coding uses a low-frequency coding method that takes advantage of the clustered nature of the quantized non-zero coefficients in the low-frequency region and a high-frequency coding method that takes advantage of the scattered nature of the quantized non-zero coefficients in the high-frequency region.

The position along the sequence where the coding method changes the low-frequency region coding method to the high-frequency region coding method is called the "breakpoint." One aspect of hybrid variable length coding is determining the position in the sequence of the breakpoint that separates the one, e.g., low-frequency region from the other, e.g., high-frequency region. Such a breakpoint must be known to a decoder to properly decode the coded coefficients. A constant breakpoint for an entire video sequence has been found to be not optimal.

U.S. application Ser. No. 11/686,778 to inventors Tian et al. titled PER BLOCK BREAKPOINT DETERMINING FOR HYBRID VARIABLE LENGTH CODING discloses a breakpoint determining methods called "per block methods" herein and that is referred to as the Per Block Breakpoint Determining Patent Application hereinafter.

U.S. application Ser. No. 11/686,860 to inventors Tian et al. titled PER MULTI-BLOCK PARTITION BREAKPOINT DETERMINING FOR HYBRID VARIABLE LENGTH CODING discloses breakpoint determining methods called "per multi-block methods" herein and that is referred to as the Per Multi-Block Breakpoint Determining Patent Application hereinafter.

U.S. application Ser. No. 11/686,898 to inventors Tian et al. titled BREAKPOINT DETERMINING FOR HYBRID VARIABLE LENGTH CODING USING RELATIONSHIP TO NEIGHBORING BLOCKS discloses breakpoint determining methods called "Context-based methods" herein and that is referred to as the Context-Based Breakpoint Determining Patent Application hereinafter.

The contents of each such U.S. application Ser. Nos. 11/686,778, 11/686,860, 11/686,898 are incorporated herein by reference.

BRIEF DESCRIPTION OF THE DRAWINGS

FIG. 4 shows an example ordered sequence of quantized coefficients used to illustrate the methods described herein, and also shows a set of candidate breakpoints.

DESCRIPTION OF EXAMPLE EMBODIMENTS

Overview

Figure 1:
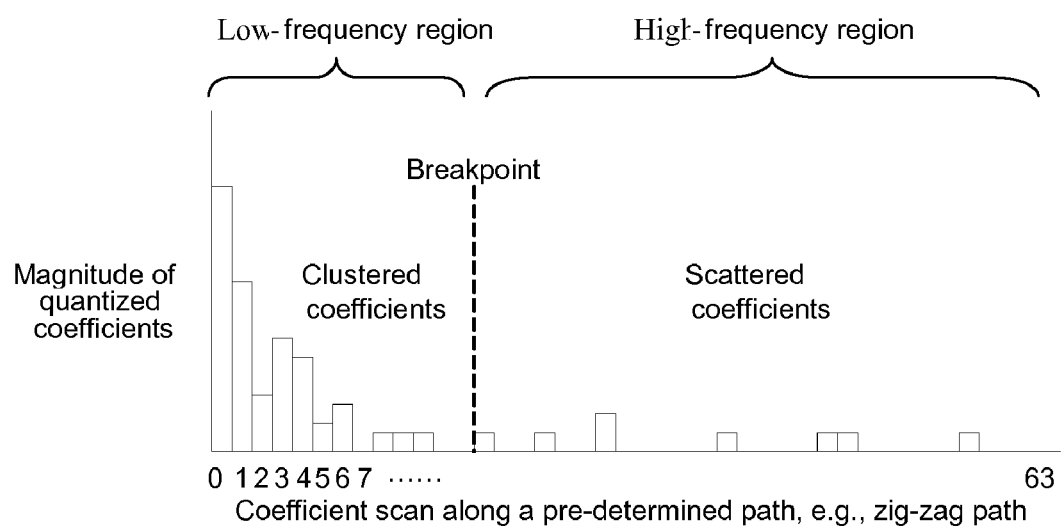
FIG. 1 shows a typical distribution of an ordered sequence of quantized coefficients of a transform block of image data.

Embodiments of the present invention include a method, and apparatus, and logic encoded in one or more computer-readable tangible medium to carry out a method of determining a breakpoint position in an ordered sequence of quantized transform coefficients of a block of image data for a hybrid variable length coding the ordered sequence. The breakpoint location in the sequence is between a low-frequency region and a high-frequency region. The hybrid variable length coding method includes coding the low-frequency region using a selected low-frequency variable length coding method; coding the high-frequency region using a selected high-frequency variable length coding method; and coding the position in the sequence of the breakpoint.

The breakpoint location is determining uses a simple and fast method based on pre-defined cost criteria. In addition, a method is described that instead of coding the breakpoint separately, codes the breakpoint jointly with coefficient events.

Particular embodiments include a method comprising, for an ordered sequence of quantized transform coefficients of a block of image data, the quantized transform coefficients having respective amplitudes including a most likely-to-occur amplitude and at least one other amplitude, and for a selected low-frequency variable length coding method that includes recognizing events that each includes a cluster of coefficients having respective amplitudes other than the most likely-to-occur amplitude, determining a set of candidate breakpoints. Each candidate breakpoint is defined by an ending event location for position events recognized in using the selected low-frequency variable length coding method. Any candidate breakpoints that defines a position after the start of the sequence is for a hybrid coding method that includes using the selected low-frequency coding method until the ending event, and using a selected high-frequency method to encode a part of the sequence starting from immediately after the ending event.

The method further includes, for each candidate breakpoint, determining the weighted sum of the number of clusters of coefficients with other than the most likely-to-occur amplitude having each cluster length possible for the candidate breakpoint, the weighting for the number of clusters having a particular cluster length being an amount proportional the particular cluster length.

The method further includes selecting as the breakpoint to use a candidate breakpoint that maximizes the weighted sum of numbers of clusters of each cluster length.

The method also includes encoding the sequence including encoding a first portion of the sequence up to and including the final ending event defined by the selected breakpoint using the selected low-frequency variable length coding method and encoding a second portion of the sequence from the first coefficient after the final ending event to the end of the sequence using the selected high-frequency variable length coding method.

Particular embodiments include a method comprising determining a breakpoint for hybrid variable length coding an ordered sequence of quantized transform coefficients of a block, or for hybrid variable length coding ordered sequences of a multi-block partition, the breakpoint determining using a relationship to properties of blocks that neighbor the block or multi-block partition. The breakpoint is defined by an ending event location for position events recognized in using a selected low-frequency variable length coding method. Hybrid variable length coding a sequence includes encoding a first portion of the sequence up to and including the final ending event defined by the breakpoint using the selected low-frequency variable length coding method and encoding a second portion of the sequence from the first coefficient after the final ending event to the end of the sequence using a selected high-frequency variable length coding method.

The method further includes encoding the ordered sequence of quantized transform coefficients of the block, or the ordered sequences of the ordered sequences of the multi-block partition, the encoding using hybrid variable length coding using the determined breakpoint.

The determined breakpoint is encoded jointly with position events as an indication in the encoding of the position events in the selected low-frequency variable length coding method of whether or not to switch from the selected low-frequency coding method to the selected high-frequency variable length coding method.

Particular embodiments include a method comprising, for each ordered sequence of quantized transform coefficients of a block of image data in a multi-block partition, the quantized transform coefficients having respective amplitudes including a most likely-to-occur amplitude and at least one other amplitude, and for a selected low-frequency variable length coding method that includes recognizing events that each includes a cluster of coefficients having respective amplitudes other than the most likely-to-occur amplitude, determining a respective set of candidate breakpoints. Each candidate breakpoint is defined by an ending event location for position events recognized in using the selected low-frequency variable length coding method. Any candidate breakpoints that defines a position after the start of the respective sequence is for a hybrid coding method that includes using the selected low-frequency coding method until the ending event, and using a selected high-frequency method to encode a part of the sequence starting from immediately after the ending event.

The method includes for each candidate breakpoint, determining the weighted sum of the number of clusters of coefficients with other than the most likely-to-occur amplitude having each cluster length possible for the candidate breakpoint for the respective sequence in the multi-block partition, the weighting for the number of clusters having a particular cluster length being an amount proportional the particular cluster length.

The method further includes, for the plurality of the blocks in the multi-block partition, determining a set of candidate breakpoints to use for all blocks of the multi-block partition, and for each such candidate breakpoint, the determining the sum of respective weighted sums for the respective blocks, each weighted sum being for a respective one of the blocks of the multi-block partition, and being for a candidate breakpoint equal to the weighted sum of the number of events in the low frequency region of the particular block, the weighting for the number of clusters having a particular cluster length being by an amount proportional the particular cluster length, wherein each candidate breakpoint is one of the candidate breakpoints of the sets of breakpoints determined in for the respective sequences of the blocks of the plurality, and applied as a soft breakpoint when determining the weighted sums for the blocks in the multi-block partition.

The method further includes comparing the sum of the weighted sums using the candidate breakpoints, and selecting as the single breakpoint the one candidate breakpoint of the set determined in that gives the maximum sum of weighted sums.

One embodiment includes encoding the plurality of the blocks using the one selected breakpoints, used as a soft breakpoint.

Particular embodiments include computer-readable medium having instructions encoded thereon that when executed by one or more processors of a processors system cause a method to be carried out. The method includes, for an ordered sequence of quantized transform coefficients of a block of image data, the quantized transform coefficients having respective amplitudes including a most likely-to-occur amplitude and at least one other amplitude, and for a selected low-frequency variable length coding method that includes recognizing events that each includes a cluster of coefficients having respective amplitudes other than the most likely-to-occur amplitude, determining a set of candidate breakpoints. Each candidate breakpoint is defined by an ending event location for position events recognized in using the selected low-frequency variable length coding method. Any candidate breakpoints that defines a position after the start of the sequence is for a hybrid coding method that includes using the selected low-frequency coding method until the ending event, and using a selected high-frequency method to encode a part of the sequence starting from immediately after the ending event.

The method further includes, for each candidate breakpoint, determining the weighted sum of the number of clusters of coefficients with other than the most likely-to-occur amplitude having each cluster length possible for the candidate breakpoint, the weighting for the number of clusters having a particular cluster length being an amount proportional the particular cluster length.

The method further includes selecting as the breakpoint to use a candidate breakpoint that maximizes the weighted sum of numbers of clusters of each cluster length.

The method also includes encoding the sequence including encoding a first portion of the sequence up to and including the final ending event defined by the selected breakpoint using the selected low-frequency variable length coding method and encoding a second portion of the sequence from the first coefficient after the final ending event to the end of the sequence using the selected high-frequency variable length coding method.

Particular embodiments include computer-readable medium having instructions encoded thereon that when executed by one or more processors of a processors system cause a method to be carried out. The method includes, determining a breakpoint for hybrid variable length coding an ordered sequence of quantized transform coefficients of a block, or for hybrid variable length coding ordered sequences of a multi-block partition, the breakpoint determining using a relationship to properties of blocks that neighbor the block or multi-block partition. The breakpoint is defined by an ending event location for position events recognized in using a selected low-frequency variable length coding method. Hybrid variable length coding a sequence includes encoding a first portion of the sequence up to and including the final ending event defined by the breakpoint using the selected low-frequency variable length coding method and encoding a second portion of the sequence from the first coefficient after the final ending event to the end of the sequence using a selected high-frequency variable length coding method.

The method further includes encoding the ordered sequence of quantized transform coefficients of the block, or the ordered sequences of the ordered sequences of the multi-block partition, the encoding using hybrid variable length coding using the determined breakpoint.

The determined breakpoint is encoded jointly with position events as an indication in the encoding of the position events in the selected low-frequency variable length coding method of whether or not to switch from the selected low-frequency coding method to the selected high-frequency variable length coding method.

Particular embodiments include computer-readable medium having instructions encoded thereon that when executed by one or more processors of a processors system cause a method to be carried out. The method includes, for an ordered sequence of quantized transform coefficients of a block of image data, the quantized transform coefficients having respective amplitudes including a most likely-to-occur amplitude and at least one other amplitude, and for a selected low-frequency variable length coding method that includes recognizing events that each includes a cluster of coefficients having respective amplitudes other than the most likely-to-occur amplitude, determining a set of candidate breakpoints. Each candidate breakpoint is defined by an ending event location for position events recognized in using the selected low-frequency variable length coding method. Any candidate breakpoints that defines a position after the start of the sequence is for a hybrid coding method that includes using the selected low-frequency coding method until the ending event, and using a selected high-frequency method to encode a part of the sequence starting from immediately after the ending event.

The method further includes, for each candidate breakpoint, determining the weighted sum of the number of clusters of coefficients with other than the most likely-to-occur amplitude having each cluster length possible for the candidate breakpoint, the weighting for the number of clusters having a particular cluster length being an amount proportional the particular cluster length.

The method further includes selecting as the breakpoint to use a candidate breakpoint that maximizes the weighted sum of numbers of clusters of each cluster length.

The method also includes encoding the sequence including encoding a first portion of the sequence up to and including the final ending event defined by the selected breakpoint using the selected low-frequency variable length coding method and encoding a second portion of the sequence from the first coefficient after the final ending event to the end of the sequence using the selected high-frequency variable length coding method.

In one embodiment, the method includes encoding all the sequences of the multi-block partition, including, for each sequence, encoding a first portion of the sequence up to the selected single breakpoint using the selected low-frequency variable length coding method and encoding a second portion of the sequence from the first coefficient after the selected single breakpoint to the end of the sequence using the selected high-frequency variable length coding method, the one single breakpoint being used as a soft breakpoint for any sequence of a block of the multi-block partition; and encoding the position of the selected single breakpoint.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Hybrid Variable Length Coding

In the description herein, it is assumed that a frame to be encoded is divided into blocks of image data. These blocks might be motion compensated, and a difference block might be determined after motion compensation. Each resulting block of image data is transformed by some transform, e.g., DCT or other transform. The coefficients are ordered, e.g., along the pre-determined path on the two-dimensional distribution, and then quantized. The description herein assumes that the quantization is to integer values that have sign and amplitude, and that zero is the most likely-to-occur amplitude, and 1 is the next most-likely-to-occur amplitude. Of course it is possible to quantize differently—the different quantized values are, after all, no more than labels that represent ranges of values. It would be straightforward for one in the art to modify the methods and techniques and apparatuses described herein to take into account other quantization schemes where zero is not the most likely-to-occur amplitude value, and/or 1 is not the next to most likely-to-occur amplitude value. The rest of this description therefore assumes, without loss of generality, that the ordered sequence of quantized coefficients has 0 as the most likely-to-occur amplitude value, and 1 as the next-to-most likely-to-occur amplitude value.

In the description herein, it is assumed that a frame to be encoded is divided into blocks of image data. These blocks might be motion compensated, and a difference block might be determined after motion compensation. Each resulting block of image data is transformed by some transform, e.g., DCT or other transform. The coefficients are ordered, e.g., along the pre-determined path on the two-dimensional distribution, and then quantized. The description herein assumes that the quantization is to integer values that have sign and amplitude, and that zero is the most likely-to-occur amplitude, and 1 is the next most-likely-to-occur amplitude. Of course it is possible to quantize differently—the different quantized values are, after all, no more than labels that represent ranges of values. It would be straightforward for one in the art to modify the methods and techniques and apparatuses described herein to take into account other quantization schemes where zero is not the most likely-to-occur amplitude value, and/or 1 is not the next to most likely-to-occur amplitude value. The rest of this description therefore assumes, without loss of generality, that the ordered sequence of quantized coefficients has 0 as the most likely-to-occur amplitude value, and 1 as the next-to-most likely-to-occur amplitude value.

Conventional two-dimensional (2D) variable length coding (VLC), commonly adopted in image and video compression, is based on a run and amplitude level representation of an ordered sequence of quantized transform coefficients determined by ordering the coefficients along a pre-defined path, e.g., zigzag path for an N×N coefficient block. Such ordering is from low-frequency to high-frequency. Conventional two-dimensional variable length coding is therefore referred to as run-amplitude level variable length coding herein. Run-amplitude level variable length coding includes collecting or assuming statistics of non-zero coefficient amplitudes and of the number of zero-valued coefficients— the run-length of zeros that precede any non-zero amplitudes along the ordering of the sequence. A two-dimensional table consisting of the amplitude and the run-length is then constructed, and optimal variable length codes such as Huffman codes are assigned to represent the events in the table.

The advantage of run-amplitude level variable length coding is that the position of each non-zero-value coefficient and its amplitude are coded simultaneously as a pair, which results in a shorter average code length than coding the position and amplitude separately. In block-based transform coding, however, there are often a number of consecutive non-zero-value coefficients along the lower frequency region of the ordering of the sequence. Instead of using a single code to represent the "n" consecutive coefficients, run-amplitude level variable length coding requires "n" separate codes, which is inefficient. Hybrid variable length coding is known, and overcomes this deficiency. See, for example, U.S. patent application Ser. No. 10/869,229, filed 15 Jun. 2004 to inventors Chen, et al., published as US 20050276487, and titled "A HYBRID VARIABLE LENGTH CODING METHOD FOR LOW BIT RATE VIDEO CODING". The elements disclosed therein are referred to collectively and individually herein as the "Basic Hybrid VLC Method." See also U.S. patent application Ser. No. 10/898,654, filed 22 Jul. 2004 to inventors Chen, et al., published as US 20050276497, and titled "AN EXTENDED HYBRID VARIABLE LENGTH CODING METHOD FOR LOW BIT RATE VIDEO CODING". The elements disclosed in U.S. Ser. No. 10/898,654 are referred to collectively and individually as the "Extended Hybrid VLC Method" herein. See also U.S. patent application Ser. No. 10/922,508, filed 18 Aug. 2004 to inventors Toebes, et al., and titled "TWO-DIMENSIONAL VARIABLE LENGTH CODING OF RUNS OF ZERO AND NON-ZERO TRANSFORM COEFFICIENTS FOR IMAGE COMPRESSION". The elements disclosed in U.S. Ser. No. 10/922,508 are referred to collectively and individually as the "2-D Non-Zero/Zero Cluster VLC Method" herein.

Hybrid coding can be extended to include more than two regions. However, for the remainder of this description, when speaking of a first and second region, it is assumed that there are two regions with a single breakpoint. The breakpoint determining is for this region between the first (low-frequency) region and the second (high-frequency) region.

FIG. 1 shows a typical distribution of an ordered sequence of quantized coefficients of a transform block of image data. As depicted in FIG. 1, the quantized non-zero coefficients in the low-frequency are likely to be more clustered than in the high-frequency region where non-zero coefficients are likely to be scattered. One embodiment of hybrid variable length coding uses coding methods that respectively take advantage of the clustered nature of the coefficients in the low-frequency region and the scattered nature of the quantized non-zero coefficients in the high-frequency region. In one embodiment, hybrid variable length coding uses two types of position coding methods. In one embodiment of hybrid variable length coding, in the low-frequency region, runs of consecutive zero-valued coefficients and runs of consecutive non-zero-valued coefficients are coded as a pair using a two-dimensional variable length coding table. In one embodiment of hybrid variable length coding, the amplitudes of the non-zero-valued coefficients are then coded by an independent, one-dimensional variable length coding table. In the high-frequency region, run-amplitude level variable length coding or a similar two-dimensional variable length coding method is retained to code the position and amplitude of each non-zero-valued coefficient as a pair.

The switching position between the low-frequency and high-frequency coding methods is termed a "breakpoint", which must be known to the decoder to properly decode the coefficients. Determining or pre-selecting a breakpoint is required for the coding using hybrid variable length coding, and how this is determined can make a difference to the achieved coding efficiency. On one hand, given the low-frequency and high-frequency coding methods, there exists an optimal breakpoint within each block of quantized coefficients, which results in the minimum number of bits in the coded coefficients. On the other hand, this optimal breakpoint varies among blocks and therefore needs to be included in the bitstream, which may introduce a considerable overhead if it is not efficiently coded. We have studied hybrid variable length coding using a constant breakpoint for the entire video sequence, and found that a single constant breakpoint, while leading to reasonable performance, is not optimal.

Different methods and approaches are described herein for performing hybrid variable length coding with variable breakpoints. These approaches generally include two elements: a method to find a proper breakpoint for at least one block of quantized coefficients, and a method to code the breakpoint in an explicit or implicit fashion. The details of different embodiments of these approaches are described herein below.

In the remainder of this description, unless otherwise noted, it is assumed that a method that combines a two-dimensional position coding method with a one-dimensional amplitude (2DP1DA) coding method, e.g., 2-D Non-Zero/Zero Cluster VLC Method as described in U.S. Ser. No. 10/922,508 is used for coding the low-frequency coefficients, while conventional run-amplitude level variable length coding is used for coding the high-frequency coefficients. Note that in 2DP1DA, 2DP means two-dimensional position coding, and 1DA means one-dimensional amplitude. Furthermore, the DC value in of the transform of the block of image data is assumed to be encoded separately, so that only the AC coefficients are included. Note that the methods described herein are not limited to using a 2DP1DA coding method, and are generally applicable to any alternative low-frequency coding method and any alternative high-frequency coding method, with or without modifications, and also to encoding the DC value with the remainder of the quantized coefficients. For example, in addition to convention two-dimensional variable length coding, the following provide alternate methods for the different, e.g., low-frequency and/or high-frequency regions, and those in the art will understand if and how to modify and incorporate the methods described therein for the low-frequency and/or high-frequency methods:

U.S. patent application Ser. No. 10/439,536 filed 16 May 2003 to inventors Chen et al, titled VARIABLE LENGTH CODING METHOD AND APPARATUS FOR VIDEO COMPRESSION, and published as US 20040228540.

U.S. patent application Ser. No. 10/342,537 filed 15 Jan. 2003 to inventors Chen et al, titled AN EXTENSION OF TWO-DIMENSIONAL VARIABLE LENGTH CODING FOR IMAGE COMPRESSION.

U.S. patent application Ser. No. 10/440,595 filed 19 May 2003 to inventors Chen et al, titled AN EXTENSION OF TWO-DIMENSIONAL VARIABLE LENGTH CODING FOR IMAGE COMPRESSION.

U.S. patent application Ser. No. 10/869,229 filed 15 Jun. 2004 to inventors Chen et al, titled A HYBRID VARIABLE LENGTH CODING METHOD FOR LOW BIT RATE VIDEO CODING, and published as US 20050276487.

U.S. patent application Ser. No. 10/898,654 filed 22 Jul. 2004 to inventors Chen et al, titled AN EXTENDED HYBRID VARIABLE LENGTH CODING METHOD FOR LOW BIT RATE VIDEO CODING and published as US 20050276497.

U.S. patent application Ser. No. 10/910,712 filed 3 Aug. 2004 to inventors Chen et al, titled VIDEO COMPRESSION USING MULTIPLE VARIABLE LENGTH CODING PROCESSES FOR MULTIPLE CLASSES OF TRANSFORM COEFFICIENT BLOCKS and published as US 20050276498.

U.S. patent application Ser. No. 10/922,508 filed 18 Aug. 2004 to inventors Toebes et al, titled TWO-DIMENSIONAL VARIABLE LENGTH CODING OF RUNS OF ZERO AND NON-ZERO TRANSFORM COEFFICIENTS FOR IMAGE COMPRESSION and published as US 20060039621.

U.S. patent application Ser. No. 10/922,507 filed 18 Aug. 2004 to inventors Chen et al, titled VIDEO CODING USING MULTI-DIMENSIONAL AMPLITUDE CODING AND 2-D NON-ZERO/ZERO CLUSTER POSITION CODING and published as US 20060039620.

U.S. patent application Ser. No. 11/069,622 filed 28 Feb. 2005 to inventors Chen et al, titled AMPLITUDE CODING FOR CLUSTERED TRANSFORM COEFFICIENTS and published as US 20060039616.

U.S. patent application Ser. No. 11/069,621 filed 28 Feb. 2005 to inventors Chen et al, titled JOINT AMPLITUDE AND POSITION CODING FOR PHOTOGRAPHIC IMAGE AND VIDEO CODING and published as US 20060039615.

U.S. patent application Ser. No. 11/069,620 filed 28 Feb. 2005 to inventors Chen et al, titled ADAPTIVE BREAKPOINT FOR HYBRID VARIABLE LENGTH CODING and published as US 20050276499.

U.S. patent application Ser. No. 11/270,138 filed 9 Nov. 2005 to inventors Chen et al, titled EXTENDED AMPLITUDE CODING FOR CLUSTERED TRANSFORM COEFFICIENTS and published as US 20060056720.

U.S. patent application Ser. No. 11/385,183 filed 20 Mar. 2006 to inventors Chen et al, titled VARIABLE LENGTH CODING FOR CLUSTERED TRANSFORM COEFFICIENTS IN VIDEO COMPRESSION.

U.S. patent application Ser. No. 11/346,757 filed 3 Feb. 2006 to inventors Chen et al, titled VARIABLE LENGTH CODING FOR SPARSE COEFFICIENTS.

The contents of each of the above patent applications are incorporated herein by reference.

Two-Dimensional Position and One-Dimensional Amplitude Coding (2DP1DA)

For completeness, an example of 2DP1DA is included. Encoding the low-frequency region coefficients includes recognizing events—position events—describable by one or more parameters, such as the run-lengths of zero value coefficients, run-lengths of non-zero-amplitude coefficients, amplitudes, signs, and so forth. These parameter(s) are encoded, e.g., by a lookup device to look up appropriate one or more lookup tables.

One embodiment of two-dimensional (2D) variable length coding jointly encodes 2D position events (2DP events) that include any run of consecutive zero-valued coefficients preceding a run of non-zero-valued coefficients. No such preceding run of zero-valued coefficients is indicated by a run-length of 0. So jointly encoding events by a 2D variable length code is found to be, on average, more efficient, for example, than encoding the same events by two independent 1D variable length codes.

In one embodiment, a single zero immediately following each non-zero coefficient cluster is included as part of the 2DP event. This effectively reduces the run-length of the zero-valued coefficients by 1 and the dimension representing run-lengths of zero-valued coefficients will start from 0 instead of 1.

Thus, one embodiment of encoding the low-frequency region of a sequence of quantized coefficients includes two-dimensional position coding to encode events that include any run of zero-valued coefficients preceding a run of non-zero-valued coefficients, and encoding amplitude events using one-dimensional amplitude coding for the non-zero-amplitudes in the runs. No immediately preceding run of zeroes is indicated by a run-length of zero.

The inventors have found that extending the 2D position events can be extended to include the "last" information representing the end of the block. Using two-dimensional position and one-dimensional amplitude coding, consider the sample coefficient sequence:

2 3 2 −1 −1 0 0 1 −1 1 . . .

This is encoded as:

$C_p(0, 5, 0)\ C_A(2)\ S(0)\ C_A(3)\ S(0)\ C_A(2)\ S(0)\ C_A(1)\ S(1)$
$C_A(1)\ S(1)\ C_P(1, 3, 1)\ C_A(1)\ S(0)\ C_A(1)\ S(1)\ C_A(1)\ S(0)$
where $C_p$(Zrun, Nzrun, Last) denotes the 2D position code of an identified event. Note that in the above stream of codewords, the second position code is "$C_p(1, 3, 1)$" rather than "$C_p(2, 3, 1)$" because the first zero coefficient has been implicitly included in the first position event coded as $C_p(0, 5, 0)$.

While such 2D position coding is anticipated to provide on average improved coding efficiency over two 1D position coding, the size of the code table used is increased. For an 8×8 block, i.e., 64 coefficients along the scan path, the total size of a 2-D code table is roughly 2×63×64=8K, including accounting for the last information. In practice, to reduce the table size, events that are relatively unlikely to appear may be coded by an "Escape" code followed by fixed numbers of bits, which indicate the runs of zero- and non-zero-valued coefficients as well as the last information.

Method to Determine a Breakpoint Per Block

The above-cited incorporated by reference Per Block Breakpoint Determining Patent Application describes a method that includes, for a plurality of blocks of image data and a respective ordered sequence of quantized transform coefficients in each block, and for a pre-selected low-frequency coding method and a pre-selected high-frequency coding method, determining a breakpoint for each block. The pre-selected low-frequency coding method includes recognizing any event that includes a cluster of quantized coefficients having respective amplitudes other than the most likely-to-occur amplitude, e.g., non-zero amplitudes, and recognizing amplitude events, or in other embodiments, recognizing joint position and amplitude events that each includes a cluster of quantized coefficients. One embodiment includes for each block determining a set of possible breakpoints, each defined by an ending event recognized by the low-frequency coding method, and the number of bits that would result from using the possible breakpoint by coding a first part of the sequence up to and including the ending event using the low-frequency coding method, and coding a second part of the sequence from the quantized coefficients immediately following the ending event. In one embodiment, the set of possible breakpoints and resulting numbers of bits are obtained by a first pass coding method and a second pass coding method. The first pass coding process includes encoding the ordered sequence using the selected low-frequency variable length coding method. The first pass coding process starts from the lowest-frequency (AC) quantized coefficient. In one embodiment, in order to be able to determine the numbers of bits used for the encoding, a data structure, e.g., a table is constructed for different locations of the ending event and tabulating the number of bits required to encode the portion of the sequence up to the ending event. In one example low-frequency coding method, position events include a run of any zero-valued coefficients that end in a single zero-valued coefficient. In one embodiment, a data structure is maintained that records three quantities for each ending event location that is coded by 2D position coding: the starting position of the event, e.g., starting with a position 0, the ending position of the event, and the accumulated number of bits that has been consumed to code the coefficients up to and including the ending event.

A second pass coding process includes encoding the sequence of the blocks using the selected high-frequency variable length coding method to determine the number of bits to encode different parts of the sequence each different part starting from after respective different ending event locations from the low-frequency method. In one embodiment, the selected high-frequency variable length coding method is performed in a reverse order starting from the non-zero-value coefficient that has the highest frequency index. In one embodiment, the accumulated number of bits of coding each part between the end and each ending event used in the low-pass coding first pass is noted. Once the coding process reaches an ending position that was recorded in the first pass using the low-frequency coding method, the method adds the accumulated number of bits consumed by the high-frequency method, in this case the run-amplitude level variable length coding to the corresponding entry from the first pass in the table.

Thus, in one embodiment, the second pass includes noting the total number of bits to encode the whole sequence for different ending events, the sequence encoded from the start to the ending event by the low-frequency method and from after the ending event by the selected high-frequency coding method.

One embodiment of the per block method further includes comparing the total number of bits to encode the whole sequence for different ending event locations for position events recognized in the first pass encoding, the total number of bits being the number of bits resulting from the first pass encoding to encode a first part of the sequence up to and including the ending event, and the number of bits resulting from the second pass encoding to encode a second part of the sequence starting from after respective different ending events.

One embodiment of the per block method further includes selecting as a final ending event the ending event that results in the least total number of bits in the comparing.

One method embodiment further includes encoding the sequence by encoding a first portion of the sequence up to and including the final ending event using the selected low-frequency variable length coding method and encoding a second portion of the sequence from the first coefficient after the final ending event to the end of the sequence using the selected high-frequency variable length coding method.

In one embodiment, the per block breakpoint found is a "soft" breakpoint in that it defines a position that the breakpoint is at the end of an event—the final ending event—coded by the low-frequency coding method. One embodiment of the per block method further includes encoding the position in the sequence of the final ending event that defines the breakpoint, e.g., using a variable length coding method. One version encodes each breakpoint separately, while another method includes coding the breakpoints of a multi-block partition jointly using a multi-dimensional variable length coding method. An individual breakpoint can be coded by any indication of a location in the sequence between the starting position and the ending position of the final ending event coded by the low-frequency coding method, e.g., by a frequency index between the index values of the start and end of such final ending low-frequency event. Alternately, encoding the optimal breakpoint value includes encoding a number representing the ordinal value of the final ending event that is coded by low-frequency coding method, in other words, an index representing which of the ending events is the final ending event, e.g., the index 1 if the final ending event is the first ending event, the index 2 if the final ending event is the second ending event, and so forth.

Using a Single Breakpoint Per Multi-Block Partition

Figure 2A:
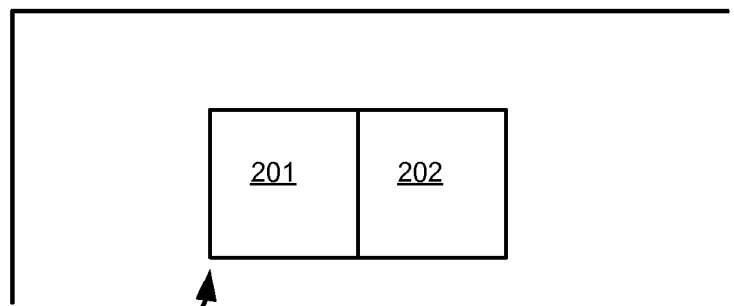
FIG. 2A shows an illustration of a 1-block by 2-block superblock for the sequences of quantized transforms coefficients of two blocks.
Figure 2B:
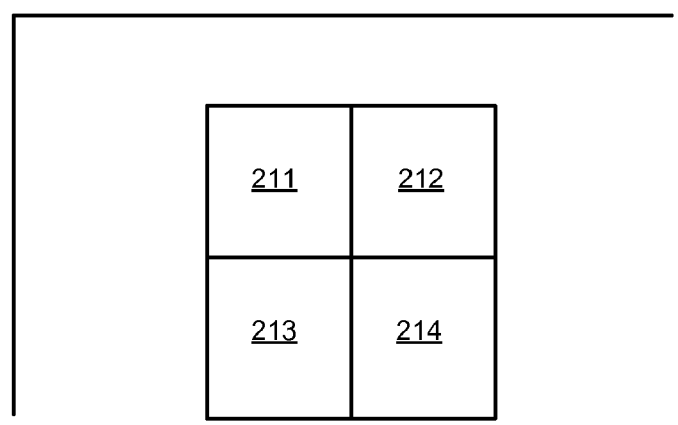
FIG. 2B shows an illustration of a 2-block by 2-block superblock for the sequences of quantized transforms coefficients of four blocks.
Figure 2C:
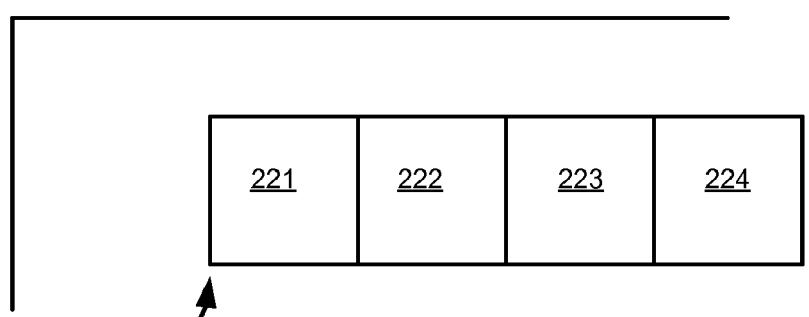
FIG. 2C shows an illustration of a 1 block by 4 block superblock for the sequences of quantized transforms coefficients of four blocks.
Figure 3:
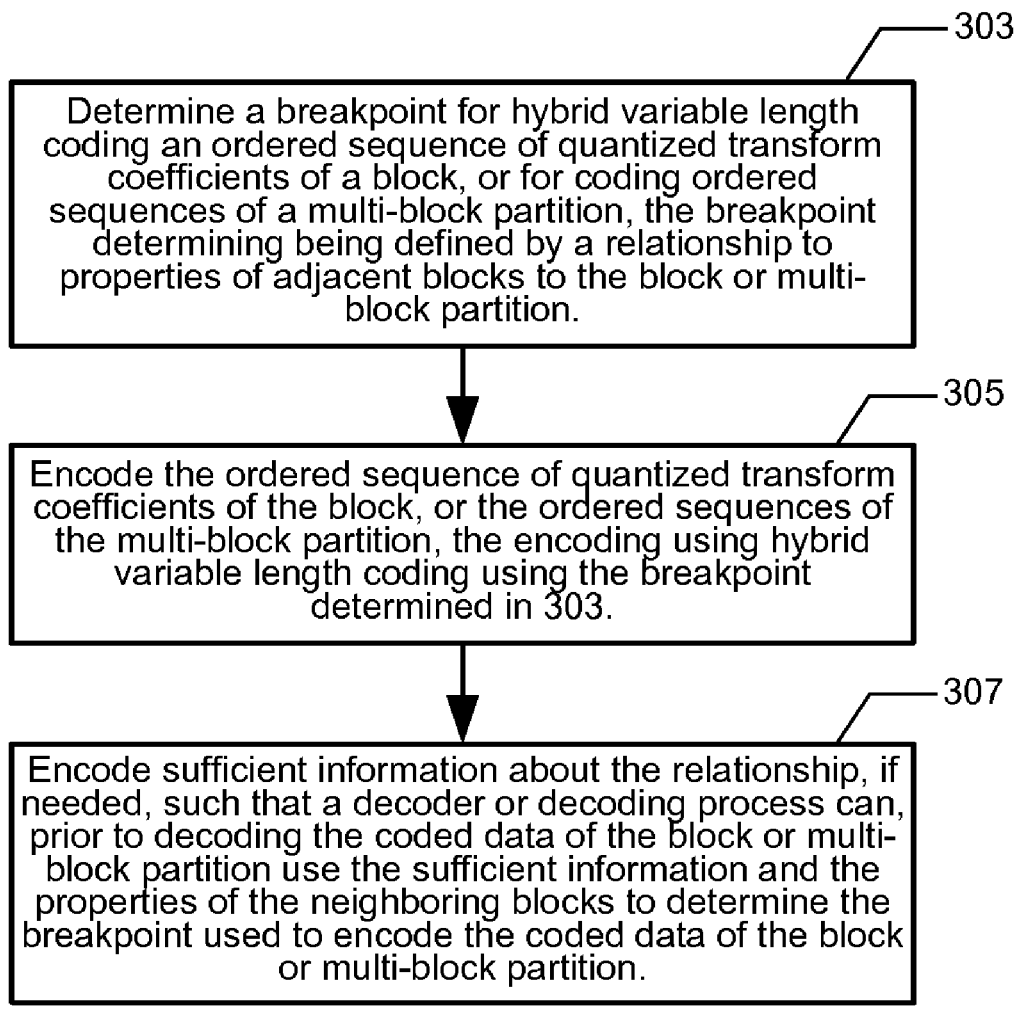
FIG. 3 shows a simplified flowchart of one embodiment of a method that includes determining a breakpoint.

Consider a partition of adjacent blocks. Denote by $N_B$ the number of blocks in the partition. While these adjacent blocks can be for a partition of any shape, in some embodiments of the invention, a partition of adjacent blocks that is rectangular is selected, in that the $N_B$ blocks form what we call a "super-block" of $N_{B1}$ blocks by $N_{B2}$ blocks, where $N_B = N_{B1} \times N_{B2}$. FIG. 2A shows an illustration of such a 1-block by 2-block partition 205 of blocks 201 and 202. FIG. 2B shows an illustration of another partition—a 2-block by 2-block partition 210 of blocks 211, 212, 213, and 214. FIG. 2C shows an illustration of another 4-block partition, a 1 block by 4 block partition 220 of four blocks 221, 222, 223, and 224 of image data. Similarly, partitions can be formed for more than 4 blocks. Note that while some of the blocks are adjacent, not all blocks are adjacent is what we call a partition of a plurality of adjacent blocks. For example, in FIG. 2C, clearly block 221 is not adjacent to block 224.

Consider a multi-block partition. The Per Block Breakpoint Determining Patent Application describes methods for determining and using a single breakpoint to use for the whole multi-block partition.

The inventors have found that using such a single breakpoint for a multi-block partition typically provides improved compression efficiency for hybrid variable length coding compared to using a single breakpoint for all blocks in an image.

Some embodiments of the present invention also use a single breakpoint for the whole multi-block partition.

Note that there may be some blocks that have only zero-valued coefficients. Such blocks are not coded. Modern coders typically include an indication in the coded bitstream, e.g., in a header sent for a block indicative of whether the block has only zero-valued coefficients.

Context-Based Breakpoints

The inventors observed that in block-based image and video coding, spatially or temporally adjacent blocks have correlated context and coefficient distributions. For example, the ordered sequence of quantized transform coefficients of a block will have a larger probability to contain non-zero coefficients if the sequences of its neighboring, e.g., adjacent blocks have non-zero coefficients than if those sequences of neighboring, e.g., adjacent blocks have only zero-valued coefficients.

The incorporated-by-reference Per Block Breakpoint Determining Patent Application and Per Multi-Block Breakpoint Determining Patent Application disclose how to determine breakpoints, and how to encode those determined breakpoints. However, there is incentive to reduce the amount of overhead required to transmit the encoded breakpoints.

The context-based methods herein described in the Context-Based Breakpoint Determining Patent Application include encoding not the breakpoint values themselves, but rather, for a particular block or multi-block partition, a relationship that would allow a decoder to determine the breakpoint that was used to encode the sequence or sequences of the particular block or multi-block partition, such that a decoder receiving the encoded information, can determine the breakpoint to carry out decoding. Some embodiments of the context-based methods use properties of neighboring, e.g., adjacent blocks to determine and/or encode (or decode) the breakpoint of a particular block or multi-block partition. The properties are such that they are known or determinable at the time when the particular block or multi-block partition is being encoded (or decoded). For example, the sequences of the neighboring, e.g., adjacent blocks may have been coded and the properties related to information obtained in the process of coding, or, at the decoding, the sequences of the neighboring, e.g., adjacent blocks may have been decoded and then re-encoded to determine the properties.

Note that while the description in the Context-Based Breakpoint Determining Patent Application focuses mostly on spatially adjacent blocks, modifying the context-based methods described therein to use the correlation between temporally adjacent blocks would be straightforward, e.g., following the same logic as described herein below. Furthermore, while Context-Based Breakpoint Determining Patent Application describes embodiments that use properties of immediately (spatially and/or temporally) adjacent blocks, the methods can readily be modified to use properties of next to immediately adjacent blocks. The term adjacent is not to be understood as immediately adjacent except when it clearly means immediately adjacent, as in the examples in some of the drawings. How to modify any method described to include or substitute one or more of these alternate features would be straightforward to those in the art from the description.

Relatively Fast Breakpoint Determining Methods

Embodiments described herein include a fast method to determine a breakpoint for coding a block of quantized coefficients or a multi-block partition by hybrid variable length coding, and a coding method that encodes the found breakpoint jointly with the low-frequency coefficients using multi-dimensional variable length coding.

Finding the Breakpoint

Consider an ordered sequence of quantized transform coefficients of a block. For each ordered sequence of quantized transform coefficients of a block of image, a candidate breakpoint describes the end of an ending event recognized by a selected low-frequency coding method. In one embodiment, such an event includes a cluster of non-zero-valued coefficients and is defined by one or more event parameters, including the run length of the cluster—the cluster length. In one embodiment, a candidate breakpoint is the position in the sequence of the zero-valued coefficient that immediately follows a cluster, i.e., a run of consecutive non-zero-valued coefficients. The start of the sequence is also a candidate breakpoint. Note that an isolated non-zero-valued coefficient is regarded as a run of consecutive non-zero-valued coefficients with the run-length equal to 1. FIG. 4 shows an example ordered sequence 400 of quantized AC coefficients of an 8×8 block of image data. In FIG. 4, the symbol ▲ is used to indicate candidate breakpoints 401, 402, 403, 404, and 405 for this example ordered sequence 400. Using N to denote an index starting with N=0 for the AC coefficient, as can be seen, the candidate hybrid variable length coding breakpoints 401-405 for the sample coefficient sequence 400 are the starting position and the zero-valued coefficients at index values N=5, 9, 12, and 16, each indicated by '▲' in FIG. 4.

Using A candidate breakpoint at the start of a sequence, e.g., 401 at N=0 implies that the entire sequence 400 is coded using the high-frequency coding method, while a candidate breakpoint at the start of a trailing sequence of zero-valued coefficients that ends at the end of the sequence, such as candidate breakpoint 405 at N=16 for this example means that the entire block will be coded by the low-frequency coding method.

Given a candidate breakpoint index denoted N, denoted by $n_z(L, N)$ the number clusters of length L, i.e., the number of runs of consecutive non-zero-valued coefficients having a run-length of non-zero-valued coefficients equal to L. By definition, $n_z(L, 0)=0$ for any L greater or equal to 0. For N>0, the evaluation of $n_z(L, N)$ depends on the particular coefficient sequence. For the example ordered quantized coefficient sequence 400 of FIG. 4, for example, some values of $n_z(L, N)$ include:

$n_z(1, 5)=0, n_z(2, 5)=0, n_z(3, 5)=1, n_z(4, 5)=0, \ldots$
$n_z(1, 9)=0, n_z(2, 9)=0, n_z(3, 9)=2, n_z(4, 9)=0, \ldots$
$n_z(1, 12)=1, n_z(2, 12)=0, n_z(3, 12)=2, n_z(4, 12)=0, \ldots$
$n_z(1, 16)=2, n_z(2, 16)=0, n_z(3, 16)=2, n_z(4, 15)=0, \ldots$ One embodiment of the invention includes for each candidate breakpoint, and for each possible cluster length, determining the numbers of clusters of non-zero-valued coefficients having different lengths.

For each candidate breakpoint value, the method includes weighting the number of clusters of a particular length by a quantity proportional to the cluster length, e.g., by a quantity proportional to by how much the run length exceeds a preselected threshold, and adding the weighted numbers of clusters of each length to determine the sum over all run length values of the number of clusters having the run lengths weighted by the quantity proportional to the run length. Denote that sum for a candidate breakpoint at index N by D(N).

$$D(N)=\Sigma_L\{n_z(L,N)*(L-C)\},$$

where $C \geq 1$ is a pre-selected constant and the summation is over values of cluster length L. The pre-selected threshold C provides a control of closeness to the lowest frequency index. The larger the value of the pre-selected threshold C, the closer the breakpoint will be to the lowest frequency index, and correspondingly, the more coefficients will be encoded by the high-frequency coding method.

For the tests conducted for a set of typical video sequences, the inventors have found that values of pre-selected threshold C=1 and C=2 each provides good coding performance when compared to coding using the optimal breakpoint determined by the per block breakpoint determining method described in the incorporated herein-by reference Per Block Breakpoint Determining Patent Application.

For a pre-selected threshold C, the method includes for a block by the value of N maximizes D(N), selecting a breakpoint denoted $N_{opt}$ given by $$N_{opt}=\mathrm{argmax}_{set\ of\ candidate\ value\ of\ N}\{D(N)\}.$$

That is, the method includes for a block, using a breakpoint that maximizes a quantity that varies as the weighted sum over all run length values of the number of clusters having each cluster length weighted by the amount the cluster length exceeds a pre-selected threshold.

In one embodiment, if more than one candidate breakpoint has the maximum value of D(N), $N_{opt}$ is selected as the candidate breakpoint that has the lowest coefficient index.

Figure 5:
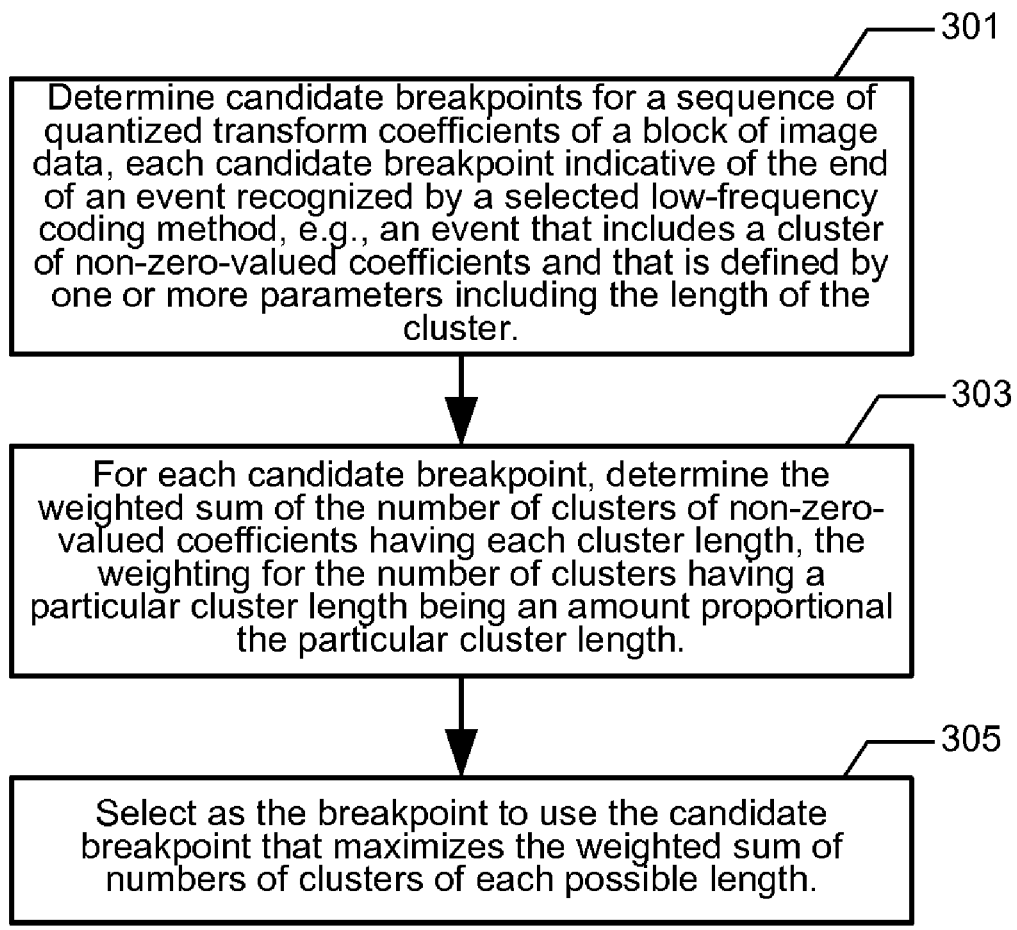
FIG. 5 shows a flowchart of one method that includes an embodiment of determining a breakpoint to use on a per block basis.

FIG. 5 that shows a flowchart of one embodiment of a method of determining the breakpoint to use for hybrid coding an ordered sequence of quantized transform coefficients, the hybrid coding including using a selected low frequency variable length coding method to code the coefficients up to the breakpoint, and a selected high frequency variable length coding method to code the coefficients that are after the breakpoint in the ordered sequence. The selected low-frequency variable length coding method includes recognizing and coding events that include a cluster of non-zero-valued coefficients and that is defined by one or more parameters including the length of the cluster.

Block 501 includes determining candidate breakpoints for the sequence, each candidate breakpoint indicative of the end of an event recognized by the selected low-frequency coding method. Block 503 includes, for each candidate breakpoint, determining the weighted sum of the number of clusters of non-zero-valued coefficients having each cluster length, the weighting for the number of clusters having a particular cluster length being an amount proportional the particular cluster length. In one version, the weighting for the number of clusters having a particular cluster length is proportional to the amount by which the particular cluster length exceeds a predefined value. Block 505 includes selecting as the breakpoint to use the candidate breakpoint that maximizes the weighted sum of numbers of clusters of each possible length.

Once the breakpoint is determined, the method includes hybrid coding the sequence, including encoding a first portion of the sequence up to the breakpoint using the selected low-frequency variable length coding method and a second portion of the sequence from the first coefficient after the breakpoint to the end of the sequence using the selected high-frequency variable length coding method.

The encoding method further includes encoding the position in the sequence in the ordered sequence of the breakpoint, e.g., encoding an index value to define the breakpoint position.

One method of implementing the process described above includes scanning the coefficient sequence once only. Recall that as part of compressing, the sequence of quantized transform coefficients is ordered, e.g., by scanned along a zig-zag two-dimensional path in the two-dimensional frequency transform space. Such a scan starts with the start of the sequence at N=0. By definition D(0)=0. As the scan progresses, the method evaluates D(N) recursively.

Denote by $N_i$ i=0, 1, . . . , the values of the candidate breakpoints, $N_0=0$ and $D(N_0)=0$. During the scan, each time candidate breakpoint $N_i$ is reached, D is updates $$D(N_i)=D(N_{i-1})+(L_i-C),$$

where $N_i$, $N_{i-1}$ denote the present and previous candidate breakpoints, respectively, and $L_i$ denotes the run-length of consecutive non-zero-valued coefficients between the two positions $N_{i-1}$ and $N_i$.

Thus, determining the weighted sums for all candidate breakpoints is carried out by scanning the ordered sequence, adding when reaching a current candidate breakpoint an increment to the sum determined for the previous candidate breakpoint proportional to the run-length of consecutive coefficients having other than the most-likely-to-occur amplitude between the present candidate breakpoint and the previous candidate breakpoint.

Consider the example sequence 400 of FIG. 4 with C=2. The scan then proceeds as follows as each candidate breakpoint is reached.

$D(0)=0,$ $D(5)=D(0)+(3-2)=1,$ $D(9)=D(5)+(3-2)=2,$ $D(12)=D(9)+(1-2)=1,$ $D(16)=D(12)+(1-2)=0,$

The breakpoint for this coefficient sequence is the candidate breakpoint that maximized D. Thus $N_{opt}=9$ It should be noted that the proposed method is not limited to per-block breakpoint determining. Consider a partition of adjacent blocks. Consider a multi-block partition of adjacent blocks and denote by $N_B$ the number of blocks in the partition. While these adjacent blocks can be for a partition of any shape, in some embodiments of the invention, a partition of adjacent blocks that is rectangular is selected, in that the $N_B$ blocks form what we call a "superblock" of $N_{B1}$ blocks by $N_{B2}$ blocks, where $N_B=N_{B1}\times N_{B2}$. See FIG. 2A, FIG. 2B and FIG. 2C for examples of differently sized multi-block partitions of image data. The Per Block Breakpoint Determining Patent Application describes methods for determining and using a single breakpoint to use for the whole multi-block partition.

When a single breakpoint is used for all blocks of a multi-block partition, such a breakpoint is applied as a soft breakpoint to each block, such that a single value for a multi-block partition can still mean that the actual breakpoints are different when hybrid coding the ordered sequence of quantized coefficients of each of the blocks.

Figure 6:
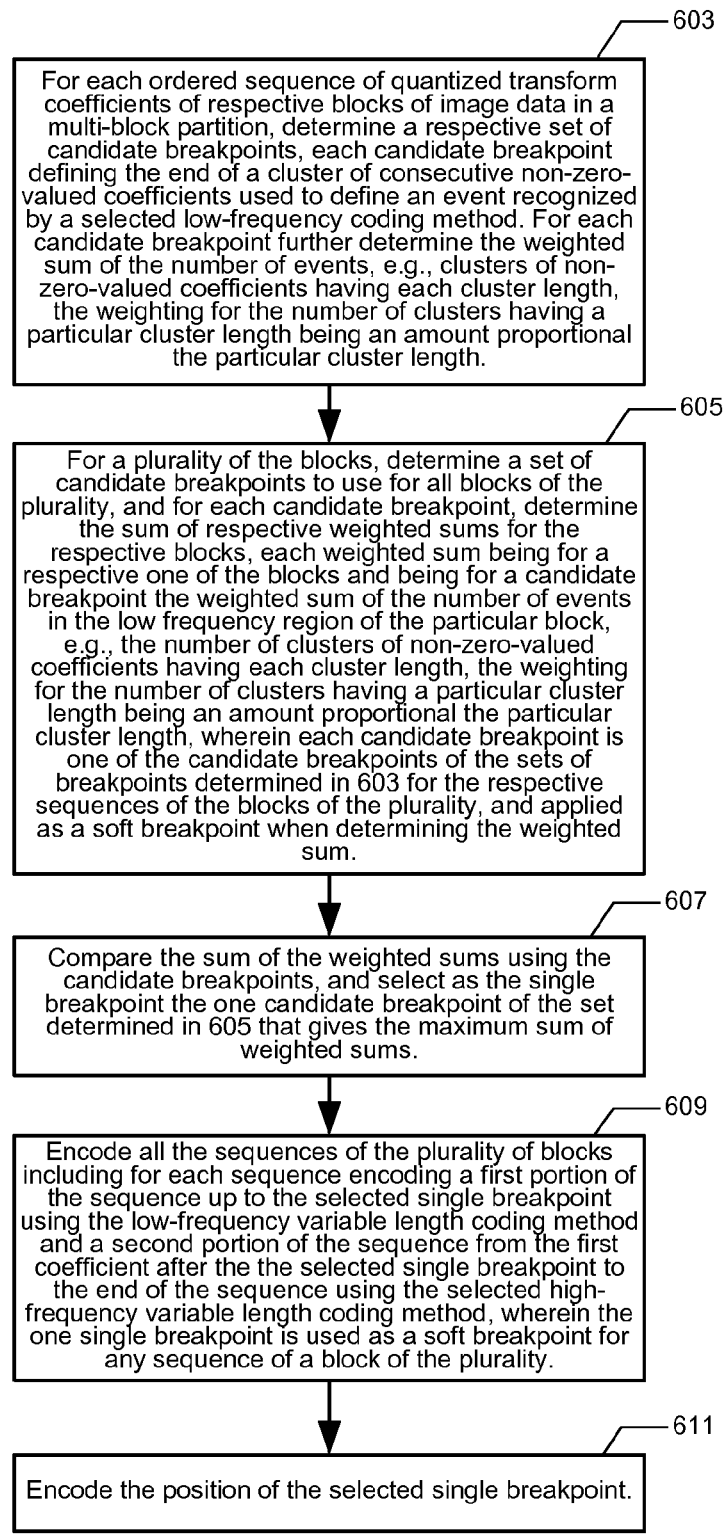
FIG. 6 shows a flowchart of one method that includes an embodiment of determining a single breakpoint to use on a per multi-block basis.

FIG. 6 shows a flowchart of one embodiment of a method applied to a multi-block partition.

The method includes, in 603, for each ordered sequence of quantized transform coefficients of respective blocks of image data in a multi-block partition, determining a respective set of candidate breakpoints. Each candidate breakpoint defines the end of a cluster of consecutive non-zero-valued coefficients used to define an event recognized by a selected low-frequency coding method. The method in 603 further includes for each candidate breakpoint determining the weighted sum of the number of events, e.g., weighted sum of the number of clusters of non-zero-valued coefficients having each cluster length. The weighting for the number of clusters having a particular cluster length being an amount proportional the particular cluster length. In one particular embodiment, the weighting is by how much the cluster length exceeds a predefined value.

The method includes, in 605, for a plurality of the blocks—the multi-block partition of blocks—determining a set of candidate breakpoints to use for all blocks of the multi-block partition. For each such candidate breakpoint, the method includes determining the sum of respective weighted sums for the respective blocks, each weighted sum being for a respective one of the blocks of the multi-block partition, and being for a candidate breakpoint equal to the weighted sum of the number of events in the low frequency region of the particular block, e.g., weighted sum of the number of clusters of non-zero-valued coefficients having each cluster length. The weighting for the number of clusters having a particular cluster length is an amount proportional the particular cluster length. Each candidate breakpoint is one of the candidate breakpoints of the sets of breakpoints determined in 603 for the respective sequences of the blocks of the plurality, and is applied as a soft breakpoint when determining the weighted sums for the blocks in the multi-block partition.

The method includes, in 607, comparing the sum of the weighted sums using the candidate breakpoints, and selecting as the single breakpoint the one candidate breakpoint of the set determined in 605 that gives the maximum sum of weighted sums.

One embodiment includes encoding the blocks of the multi-block partition. The method includes in 609 encode all the sequences of the plurality of blocks including, for each sequence, encoding a first portion of the sequence up to the selected single breakpoint using the low-frequency variable length coding method and encoding a second portion of the sequence from the first coefficient after the selected single breakpoint to the end of the sequence using the selected high-frequency variable length coding method. The one single breakpoint is used as a soft breakpoint for any sequence of a block of the plurality.

One embodiment includes in 611 encoding the position of the selected single breakpoint.

The inventors have found that using such a single breakpoint for a multi-block partition typically provides improved compression efficiency for hybrid variable length coding compared to using a single breakpoint for all blocks in an image.

Some embodiments of the present invention also use a single breakpoint for the whole multi-block partition.

Note that there may be some blocks that have only zero-valued coefficients. Such blocks are not coded. Modern coders typically include an indication in the coded bitstream, e.g., in a header sent for a block indicative of whether the block has only zero-valued coefficients.

Coding the Breakpoint Position

To properly decode the coded bitstream of codewords at the decoding side, the breakpoint that indicates the position wherein there is switching between using the low-frequency variable length coding method and the high-variable length coding method needs to be included in the bitstream. Incorporated herein-by reference Per Block Breakpoint Determining Patent Application and incorporated herein-by reference Per Multi-Block Breakpoint Determining Patent Application each describe methods that encode the breakpoint independently by one-dimensional variable length coding.

One feature of the present invention is coding the breakpoint position jointly with the coefficients by multi-dimensional variable length coding. In one embodiment of the invention, this is achieved by modifying the position coding of the events in the low-frequency coding method to include a "switch"-bit in each codeword to indicate whether or not a switch occurs at that event position.

In one particular embodiment, the joint coding method jointly encodes an event defined by the 1) the run length of any run of consecutive zero-valued coefficients preceding a cluster of one or more consecutive non-zero valued coefficients, with a run length of 0 defining no zero valued coefficients, and 2) the run length of non-zero-valued coefficients in the cluster with two additional binary valued parameters: a first parameter, herein denoted "Last" to indicate whether or not there are any more non-zero-valued coefficients in the ordered sequence, and a second parameter, herein denoted "Switch" to indicates whether or not the present event is the last event encoded using the low-frequency variable length coding method, such that if Switch is true, and Last is false so there are more non-zero-valued coefficient in the sequence, a decoder should assume that the reminder of the sequence is encoded using the high-frequency variable length coding method. Note that the "Switch" information is not applicable when "Last" indicates that there is no more non-zero-valued coefficients remaining in the ordered sequence.

In one embodiment, an event that includes a cluster of one or more non-zero-valued coefficients encoded by the low-frequency position coding method is defined by four parameters as follows:

(Zrun, Nrun, Last, Switch), where Zrun defines the run length of any run of consecutive zero-valued coefficients preceding the cluster, with a Zrun=0 defining no preceding zero-valued coefficients, Nrun defines the length of the cluster, and Last and Switch are as defied above.

One embodiment includes using a variable length code mapping to code the position events, such that events that are more likely to occur are, on average, coded by a shorter code word than events that are relatively less likely to occur. In one embodiment, a multi-dimensional variable length coding table is used. In one embodiment, the code tables are obtained by actual collecting actual statistics are to determine the likelihood of each event as defined by different values of the parameters. In another embodiment, statistics are assumed, e.g., from typical images and used for pre-defined multidimensional code tables.

Denote by $CP_p$(Zrun, Nrun, Last, Switch) the codeword used to encode the position event defined by (Zrun, Nrun, Last, Switch).

As is common, some of the more rare events are coded using a fixed length codeword.

The amplitude and sign of the non-zero-valued coefficients can be encoded by any of many methods.

A simple example is now presented to illustrate an embodiment. To simplify the example, coding the sign will not be included. Assume that the amplitudes of any non-zero-valued coefficients are encoded by one-dimensional variable length coding, separate from the position coding. Of course those in the art will understand that jointly encoding amplitude values also is possible. For an amplitude denoted Level, denote by $C_A$(Level) the codeword according to the low-frequency coding method for the amplitude Level.

For the high frequency part, assume that the high-frequency coefficients are coded by a modification of conventional two-dimensional run length variable length coding that jointly encodes the position of any non-zero valued coefficient with the amplitude value and a binary-valued indication, denoted "Last" of whether or nor there are any more non-zero-valued coefficients in the ordered sequence. Thus, the high-frequency variable length coding method includes encoding events defined by three parameters:

(Zrun, Level, Last)

where zrun is as defined above, Level denotes the amplitude of the non-zero-valued coefficient, and Last is as defined above. Denote by $C_H$ (Zrun, Level, Last) the codeword assigned by the high-frequency variable length coding method for the event defined by (Zrun, Level, Last).

Finally, assume that a start bit of 1 is used to indicate that the coding starts with the low-frequency variable length coding method. For the example sequence shown in FIG. 4, and for the breakpoint determined according the above described per block breakpoint determining method, i.e., using $N_{opt}=9$, the sequence is encoded into the following stream of codewords:

$$1+C_P(1,3,0,0)+C_A(8)+C_A(5)+C_A(2)+CP(0,3,0,1)+C_A(3)+C_A(2)+C_A(3)+C_H(1,1,0)+C_H(3,1,1),$$

where "+" indicates concatenation. Note that for simplicity, for purpose of illustration, the encoding of signs have not been included.

The start-bit is needed because a breakpoint of zero may be chosen for an ordered sequence of quantized coefficients for a block image data, in which case the entire block is be coded by the high-frequency variable length coding method. A start bit of 0 indicates the whole sequence is encoded using the high-frequency coding method.

As can be seen, the breakpoint is encoded in a joint and embedded manner with the positions of low-frequency coefficients.

In an alternate embodiment, to reduce the overhead of using one start bit for each block or multi-block partition, in one embodiment, a non-zero-valued breakpoint is assumed by both the encoder and decoder. This forces coding of the sequence of a block to start with the low-frequency variable length coding method. By this way, at least one low-frequency codeword will be presented in the resulting bitstream.

Yet another embodiment uses neighboring block information. One embodiment uses a context-based strategy to reduce the start-bit overhead. The method follows the context-based breakpoint determining methods described in the incorporated herein by reference Context-Based Breakpoint Determining Patent Application. Recall a context based method uses knowledge of information of "causally adjacent" blocks.

By the "context" of a to-be-coded block or multi-block partition is meant the neighboring, e.g., immediately adjacent, blocks. In one embodiment, the context of a to-be-coded block or multi-block partition includes the already coded neighboring, e.g., immediately adjacent blocks. Assuming a top-to-bottom, left-to-right raster order of coding (or decoding), FIG. 9A and FIG. 9B respectively show spatially immediately adjacent blocks to a to-be-coded (or decoded) block, and spatially adjacent blocks to a to-be-coded (or decoded) multi-block partition. A relationship to one or more properties of such spatially adjacent blocks is used on embodiments of the invention and is used to determine the breakpoint to use to code (or decode) the to-be-coded (or to-be-decoded) block or multi-block partition. In the scenario shown in FIG. 9A, applicable to a per block breakpoint determining method, consider a subject block 901. Adjacent blocks 902 and 903 are both adjacent and already coded (or decoded) assuming a left-to-right top-to-bottom raster coding (or decoding) order, and so are regarded as the neighboring context of the subject block 901. In the scenario shown in FIG. 9B, applicable to a per block breakpoint determining method, for a subject multi-block partition, say a superblock that includes blocks 911, 912, 913 and 914, blocks 716, 917, 918, and 919 are both adjacent and already coded (or decoded) assuming a left-to-right top-to-bottom raster coding (or decoding) order, so are considered as the neighboring context of the subject four-block partition.

Figure 7A:
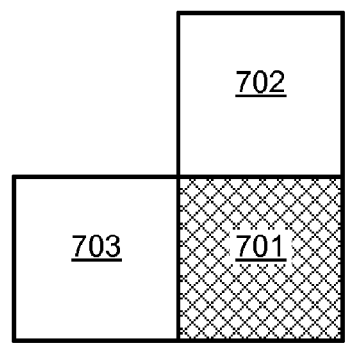
FIG. 7A and FIG. 7B respectively show spatially immediately adjacent blocks to a to-be-coded (or decoded) block, and spatially adjacent blocks to a to-be-coded (or decoded) multi-block partition, and used to illustrate an embodiment of the present invention that uses the context of causal neighbors.
Figure 7B:
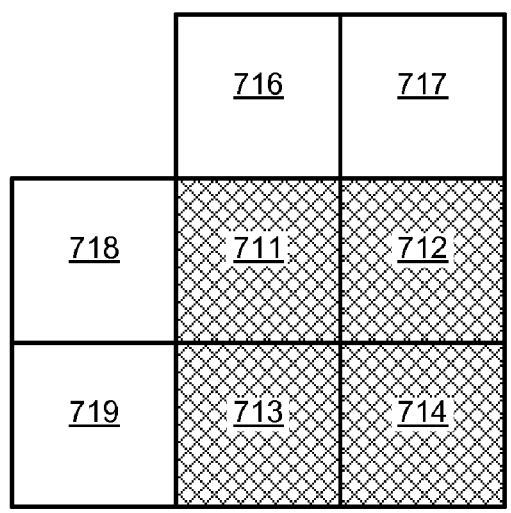
Figure 8:
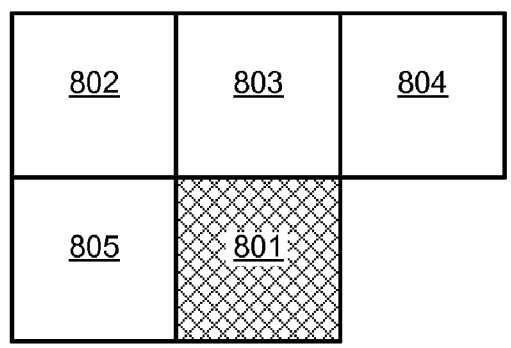
FIG. 8 shows an alternate arrangement of more blocks used as neighboring blocks than the example of FIG. 4A.

To generalize what is shown in FIGS. 9A and 7B for a selected coding and decoding order, e.g., an order possible other than a top-to-bottom, left-to-right raster order, for a particular block or multi-block partition, the neighboring blocks of the context are the immediately adjacent blocks that are vertically and horizontally adjacent to the particular block or multi-block partition and whose properties are known or determinable at the time of coding or decoding for the coding and decoding order. For example, these would be those that are immediately below and immediately to the right in a bottom-to-top, right-to-left coding and decoding order.

Different embodiments may include more or fewer blocks in the context. For example, in the example scenario shown in FIG. 10 applicable to a per block breakpoint determining method. Suppose the subject to-be coded (or decoded) block is block 1001. In an alternate embodiment, blocks adjacent blocks 1002, 1003, 1004, and 1005 are both adjacent, in this case including diagonal adjacency, and already coded (or decoded) assuming a left-to-right top-to-bottom raster coding (or decoding) order, and so in such an alternate embodiment, are regarded as in the neighboring context of the subject block 1001.

Based on the context of adjacent, previously encoded (decoded) blocks, the encoder (decoder) can determine if a block should be encoded (decoded) solely by the high-frequency variable coding method or by the hybrid coding method that includes a low-frequency variable length coding method.

As an example, consider a sample strategy using the context as defined by FIG. 9A. The block 701 is encoded hybrid variable length coding only when one of its adjacent blocks, 702 or 703 has a nonzero optimal breakpoint.

When using context, when the present block is determined to be coded solely by high-frequency coding, a start bit is not used. Because only causal neighbors are used in the context, a decoder can ascertain whether or nor a to-be-decoded block was coded solely using the high-frequency coding method, or hybrid coding based on the context of adjacent already-decoded blocks. For those blocks that are selected to be coded by hybrid variable length coding, a start bit should be used to indicate which coding method the decoder should start with, if the breakpoint is allowed to be zero. Alternatively, the start bit can be eliminated by forcing the coding to start with the low-frequency scheme, at a possible loss of the optimality of breakpoints.

Additional Low-Frequency Coding Methods

Different embodiments of the invention can use different methods for the low-frequency variable length coding method, and also different methods for the high-frequency coding methods.

One embodiment of the low-frequency coding method is described above and includes two-dimensional position and one-dimensional amplitude coding (2DP1DA).

One embodiments of the low-frequency variable length coding method includes using one-dimensional position and one-dimensional amplitude coding (1DP1DA) to represent the position and the coefficient amplitudes of any clusters in the low-frequency region. Conventional run-level coding is used to represent the position and amplitude information for each non-zero-valued coefficient individually. In one embodiment, for a cluster of non-zero-valued coefficients, an alternative way of denoting the position and amplitude information is to indicate (a) the run of zero-valued coefficients preceding the non-zero cluster, (b) the run of non-zero-valued coefficients in the cluster, and (c) the magnitudes (and the signs) of the non-zero-valued coefficients. Three symbols: Zrun, Nzrun, and Level, are used to denote the information. Thus, one embodiment includes recognizing and coding events that are denoted by these symbols.

One embodiment of the invention that uses hybrid coding uses two-dimensional position and multi-dimensional amplitude coding (2DPmDA). In one version, this includes recognizing and encoding two-dimensional position events and rather than using one-dimensional amplitude variable length coding, using multi-dimensional variable length coding to encode runs of more than one consecutive non-zero-valued amplitudes. That is, for a run of "m" consecutive non-zero-valued coefficients, instead of using "m" one-dimensional variable length codes, a single 'm' dimensional code, e.g., coding table is used to code the entire 'm' coefficients.

One embodiment uses in the low-frequency method integrated position and amplitude coding (mDPAInt), also called joint position and amplitude coding. Rather than encoding the position and amplitude of clustered non-zero-valued coefficients in the low-frequency region independently, some embodiments of low-frequency encoding include jointly coding the position and the amplitude events.

One embodiment uses in the low-frequency method integrated position and amplitude coding with low valued amplitude and low number of clusters coding, e.g., 3D integrated position and amplitude coding.

Other low-frequency and high-frequency encoding methods are possible, as described in the above-cited incorporated-by-reference patent applications.

Decoding

While the above descriptions were mostly of coding methods, those in the art will understand that the present description also leads to decoding methods and apparatuses that decode a bitstream that was coded by any of the coding embodiments described herein.

One embodiment includes a decoding method that includes accepting a bitstream that includes codewords of a to-be-decoded block or multi-block partition of image data encoded by a coding method. The coding method includes: (a) determining a breakpoint for hybrid variable length coding an ordered sequence of quantized transform coefficients of a block, or for hybrid variable length coding ordered sequences of a multi-block partition, the breakpoint determining using the method described herein, e.g., in FIG. 5 on a per-block basis, or FIG. 6 on a per-multi-block basis; (b) encoding the ordered sequence of quantized transform coefficients of the block, or the ordered sequences of the ordered sequences of the multi-block partition, the encoding using hybrid variable length coding using the breakpoint determined in (a); and (c) encoding any additional information about the relationship that together with the properties of the neighboring blocks is sufficient to determine the breakpoint used to encode the coded data of the to-be-decoded block or multi-block partition.

The decoding method includes decoding any such additional information for the to-be-decoded block or multi-block partition, and determining the properties of blocks neighboring the to-be-decoded block or multi-block partition. The decoding method further includes determining the breakpoint used to encode the to-be-decoded block or multi-block partition. The decoding method further includes recognizing codewords in the bitstream; and decoding the recognized codewords to determine the sequence or sequences of the block or multi-block partition.

Apparatus

While the above descriptions were mostly of coding methods, those in the art will understand that from the above description, a coding apparatus can straightforwardly be built, so that some embodiments of the invention are in the form of coding apparatuses. Furthermore, a decoding apparatus can be built.

Figure 9:
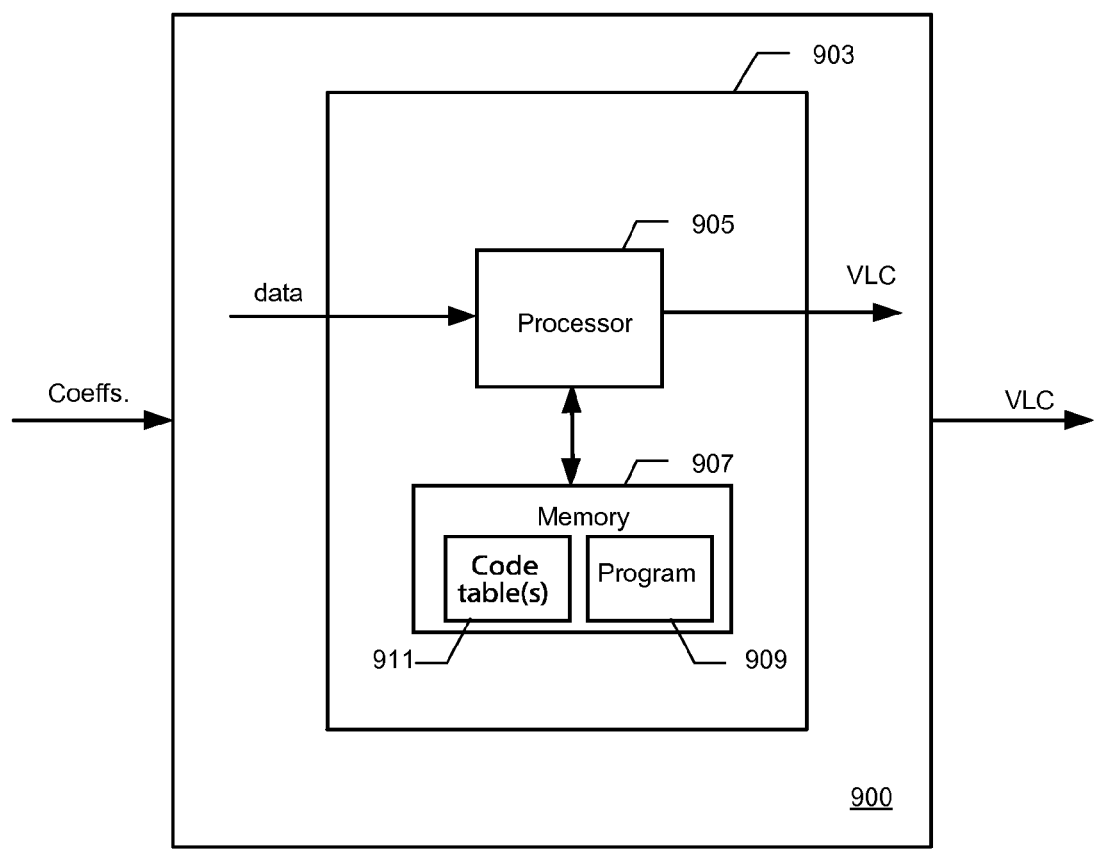
FIG. 9 shows an embodiment that includes an apparatus that is operative to implement a coding method as described herein.

FIG. 9 shows an embodiment that includes an apparatus 900 that is operative to implement a coding method as described herein, including determining a variable breakpoint and encoding the position in the sequence of the breakpoint. Apparatus 900 includes processing system 903 that includes one or more processors 905 and a memory 907. A single processor is shown in FIG. 9 and those in the art will appreciate that this may represent several processors. Similarly, a single memory subsystem 907 is shown, and those in the art will appreciate that the memory subsystem may include different elements such as RAM, ROM, and so forth. In addition, the memory subsystem is meant to include any non-volatile memory storage such as a magnetic or optical storage component. A computer program 909 is included and is loaded into the memory 907. Note that at any time, some of the programs may be in the different parts of the memory subsystem, as will be understood by those in the art. The program 909 includes instructions to instruct the processor to implement, in different versions, the different coding methods usable as the second variable length coding method. In the embodiment shown, the method uses one or more coding tables 911 in the memory subsystem 907.

Figure 10:
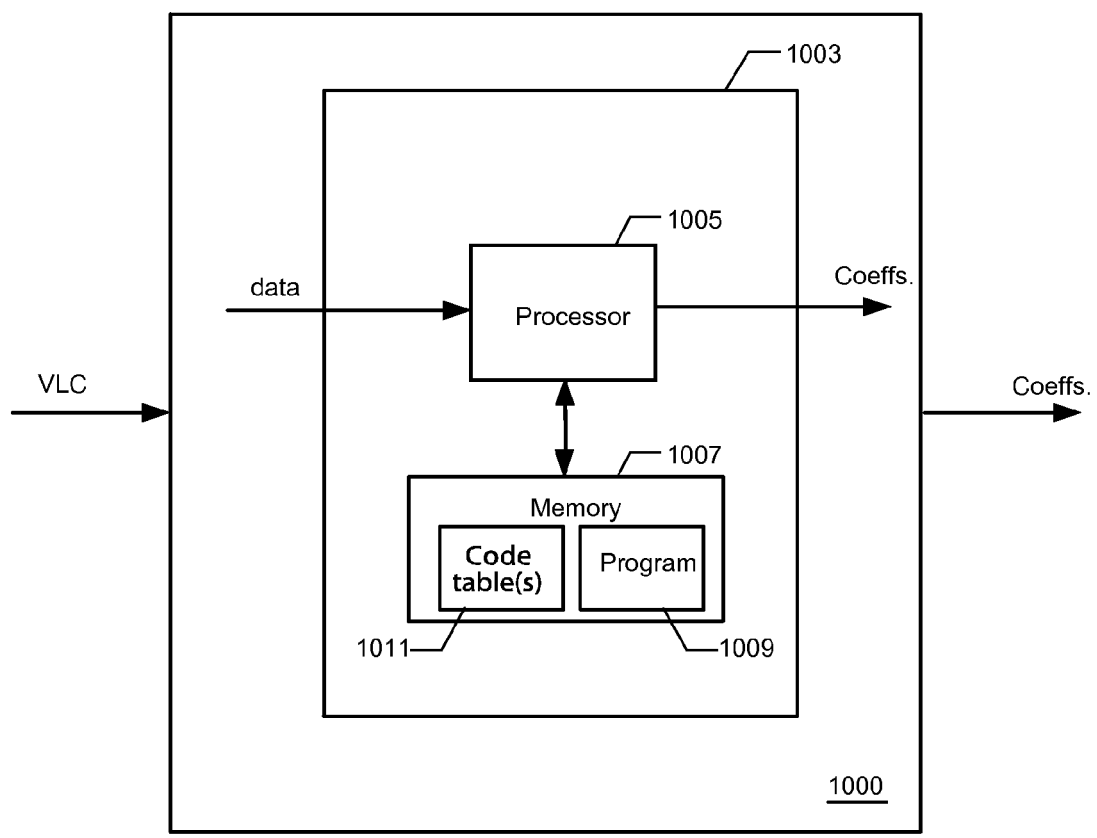
FIG. 10 shows an embodiment that includes an apparatus operative to implement a decoder of a variable length coding method described herein

FIG. 10 shows another embodiment that includes an apparatus 1000 operative to implement a decoder of a variable length coding method described herein that includes determining a variable breakpoint. Decoding apparatus 1000 includes a processing system 1003 that includes one or more processors 1005 and a memory 1007. A single processor is shown in FIG. 10 and those in the art will appreciate that this may represent several processors. Similarly, a single memory subsystem 1007 is shown, and those in the art will appreciate that the memory subsystem may include different elements such as RAM, ROM, and so forth. In addition, the memory subsystem is meant to include any non-volatile memory storage such as a magnetic or optical storage component. A computer program 1009 is included and is loaded into the memory 1007. Note that at any time, some of the programs may be in the different parts of the memory subsystem, as will be understood by those in the art. The program 1009 includes instructions to instruct the processor to implement, in different versions, the decoding process described above, including determining the properties of neighboring blocks and using the properties to determine the breakpoint used to encode a block or multi-block partition, and recognizing and decoding of codewords. In the embodiment shown, the decoding method uses one or more coding tables 1011 in the memory subsystem 1007.

Other embodiments include logic encoded in one or more tangible media for execution and when executed operative to carry out any of the coding methods described herein. How to implement such logic would be clear to one in the art from the description herein.

Other embodiments include software encoded in one or more computer-readable media and when executed operative to carry out any of the coding methods described herein. How to implement such software would be clear to one in the art from the description herein.

Other embodiments include a computer-readable carrier medium carrying a set of instructions encoded thereon that when executed by one or more processors of a processing system cause the one or more processors to carry out any of the coding methods described herein.

As described above, alternative low-frequency coding methods with variable breakpoints, such as the integrated position and amplitude coding, can be used. See the above-referenced and incorporated herein by reference patent applications for alternate low-frequency and high-frequency methods.

The term "sequence" as used herein for the sequence of quantized coefficients is sometimes referred to as a "block" of quantized coefficients, and also as a "series" of quantized coefficients. Those in the art will understand that such terms may be interchangeably used and the meaning would be clear to those in the art from the context.

Note that the description herein assumes that each series includes two regions, a low-frequency region, and a high-frequency region. It is possible to partition the whole sequence containing all the coefficients of the transforming, quantizing and ordering the block of image data. The methods described herein would then be applicable to a sequence that does not necessarily include all of the quantized coefficients but that still includes a low-frequency region where non-zero-valued quantized coefficients are likely to be clustered, and an immediately following high-frequency region where non-zero-valued quantized coefficients are likely to be scattered amongst zero-valued quantized coefficients. Those in the art will therefore understand that the claims herein are applicable to such a case, the breakpoint being the position in the sequence between the low- and high-frequency regions. For example, the sequence in such a case could include just low- and high-frequency regions and not the whole sequence of quantized transform coefficients.

Also, in the description, it is assumed that the sequence includes only the AC coefficients and that the DC coefficient of the transform of the block is separately encoded. How to modify the methods described herein to include the DC coefficient would be clear to those in the art.

Furthermore, in the description of example embodiments it was assumed that the quantization of coefficients is such that zero is the most likely to occur amplitude, and 1 is the next most likely to occur amplitude. Of course it is possible to quantize in a manner so that other values or symbols are used for the most likely-to-occur quantized value or values, and different other values or symbols are used for the next most likely-to-occur quantized value or values. Those in the art will understand how to modify the particulars described herein to accommodate such variations, and such variations are certainly meant to be within the scope of the present invention.

Furthermore, the invention is not limited to any one type of architecture or type of transform encoding. The discrete cosine transform (DCT) is one possible transform. Other transforms may be used, e.g., the new H.264/MEG-4 AVC video coding standard/draft standard defines 4×4 blocks and a DCT-like 4×4 integer transform.

The invention does not depend on any particular type of inter-frame coding if used, or of motion compensation if used for inter-frame coding, or any intra-estimation if used for estimating the pixels of a block using information from neighboring blocks.

Note that variable length coding is sometimes referred to as entropy coding or statistical coding.

Note that the terms coding and encoding are used interchangeably herein.

In some of the embodiments described above, no sign data was included. Most transforms produce positive and negative coefficients, and the forming of the codeword includes an indication of the sign of any non-zero-valued coefficients. In one version, the sign information for any runs of non-zero amplitudes in any region is added together with the information of each amplitude. In an alternate embodiment, the sign information for any runs of non-zero amplitudes in any region may be included in a different manner, e.g., as a code for the series of signs. Other alternate embodiments are also possible for encoding the sign.

Note that in some examples for amplitude encoding, 63 or 127 possible non-zero values can be assumed for the coefficients. The invention however is not restricted to any number of possible quantization values.

Note also that the term amplitude is irrespective of sign. Therefore, for example, coefficient of values+1 and −1 both have amplitude 1.

While one embodiment described herein includes a memory that stores coding tables, other embodiments store the coding information in the form of a data structure other than a table, e.g., a structure that includes a tree. Other data structures may also be used. Similarly, while one embodiment described herein includes a memory that stores a decoding, other embodiments store the decoding information in the form of a data structure other than a table for the decoding.

Note also that the present invention does not depend on the particular type of variable length coding used for any of the coding methods, e.g., the coding tables, and can work, for example, with Huffman coding and with arithmetic coding methods. Furthermore, while embodiments have been described that use fixed encoding for the events based on assumed or a priori likelihoods of occurrence of the events (also called the symbols), i.e., the likelihoods of occurrence of the events do not change, other embodiments use adaptive encoding, i.e., the encoding is changeable according to statistical data such as histograms collected from the actual coefficients.

Unless specifically stated otherwise, as apparent from the following discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps, is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be included in a computer program product.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating an encoding apparatus, the method comprising:
    for an ordered sequence of quantized transform coefficients of a block of image data, the quantized transform coefficients having respective amplitudes including a most likely-to-occur amplitude and at least one other amplitude, and for a selected low-frequency variable length coding method that includes recognizing events that each includes a cluster of coefficients having respective amplitudes other than the most likely-to-occur amplitude, determining a set of candidate breakpoints, each candidate breakpoint being defined by an ending event location for position events recognized in using the selected low-frequency variable length coding method, any candidate breakpoints that defines a position after the start of the sequence being for a hybrid coding method that includes using the selected low-frequency coding method until the ending event, and using a selected high-frequency method to encode a part of the sequence starting from immediately after the ending event;
    for each candidate breakpoint, determining a weighted sum of the number of clusters of coefficients with other than the most likely-to-occur amplitude having each cluster length possible for the candidate breakpoint, the weighted sum using, for the number of clusters having a particular cluster length, a weighting that is an amount proportional the particular cluster length;
    selecting as the breakpoint to use a candidate breakpoint that maximizes the weighted sum of numbers of clusters of each cluster length;
    encoding the sequence including encoding a first portion of the sequence up to and including the final ending event defined by the selected breakpoint using the selected low-frequency variable length coding method and encoding a second portion of the sequence from the first coefficient after the final ending event to the end of the sequence using the selected high-frequency variable length coding method.

2. A method as recited in claim 1, further comprising encoding the position in the ordered sequence of the breakpoint selected breakpoint such that a decoder can know how to decode a coded bitstream.

3. A method as recited in claim 2, wherein the selected low-frequency coding method includes one-dimensional position and one-dimensional amplitude coding.

4. A method as recited in claim 2, wherein the selected low-frequency coding method includes two-dimensional position and one-dimensional amplitude coding.

5. A method as recited in claim 2, wherein the selected low-frequency coding method includes integrated position and amplitude coding.

6. A method as recited in claim 2, wherein the selected low-frequency coding method includes two-dimensional position and multi-dimensional amplitude coding.

7. A method as recited in claim 2, wherein the selected low-frequency coding method includes integrated position and amplitude coding with low valued amplitude and low number of clusters coding.

8. A method as recited in claim 2, wherein the selected breakpoint is encoded jointly with position events as an indication in the encoding of the position events in the selected low-frequency variable length coding method of whether or not to switch from the selected low-frequency coding method to the selected high-frequency variable length coding method.

9. A method as recited in claim 1, wherein 0 is the most likely-to-occur amplitude such that position events for the selected low-frequency variable length coding method include a cluster of one or more non-zero-valued quantized coefficients.

10. A method as recited in claim 1, wherein the weighting for the number of clusters having a particular cluster length is proportional to the amount by which the particular cluster length exceeds a pre-defined value.

11. A method as recited in claim 1, wherein determining the weighted sums for all candidate breakpoints is carried out by scanning the ordered sequence, adding when reaching a current candidate breakpoint an increment to the sum determined for the previous candidate breakpoint proportional to the run-length of consecutive coefficients having other than the most-likely-to-occur amplitude between the present candidate breakpoint and the previous candidate breakpoint.

12. A method of operating an encoding apparatus, the method comprising:
    determining a breakpoint for hybrid variable length coding an ordered sequence of quantized transform coefficients of a block, or for hybrid variable length coding ordered sequences of a multi-block partition, the breakpoint determining using a relationship to properties of blocks that neighbor the block or multi-block partition, wherein the breakpoint is defined by an ending event location for position events recognized in using a selected low-frequency variable length coding method, wherein hybrid variable length coding a sequence includes encoding a first portion of the sequence up to and including the final ending event defined by the breakpoint using the selected low-frequency variable length coding method and encoding a second portion of the sequence from the first coefficient after the final ending event to the end of the sequence using a selected high-frequency variable length coding method;

encoding the ordered sequence of quantized transform coefficients of the block, or the ordered sequences of the ordered sequences of the multi-block partition, the encoding using hybrid variable length coding using the determined breakpoint, wherein the determined breakpoint is encoded jointly with position events as an indication in the encoding of the position events in the selected low-frequency variable length coding method of whether or not to switch from the selected low-frequency coding method to the selected high-frequency variable length coding method.

13. A method of operating an encoding apparatus, the method comprising:

(a) for each ordered sequence of quantized transform coefficients of a block of image data in a multi-block partition, the quantized transform coefficients having respective amplitudes including a most likely-to-occur amplitude and at least one other amplitude, and for a selected low-frequency variable length coding method that includes recognizing events that each includes a cluster of coefficients having respective amplitudes other than the most likely-to-occur amplitude, determining a respective set of candidate breakpoints, each candidate breakpoint being defined by an ending event location for position events recognized in using the selected low-frequency variable length coding method, any candidate breakpoints that defines a position after the start of the respective sequence being for a hybrid coding method that includes using the selected low-frequency coding method until the ending event, and using a selected high-frequency method to encode a part of the sequence starting from immediately after the ending event;

(b) for each candidate breakpoint determined in (a), determining a weighted sum of the number of clusters of coefficients with other than the most likely-to-occur amplitude having each cluster length possible for the candidate breakpoint for the respective sequence in the multi-block partition, the weighted sum using, for the number of clusters having a particular cluster length, a weighting that is an amount proportional the particular cluster length;

(c) for the plurality of the blocks in the multi-block partition, determining a set of candidate breakpoints to use for all blocks of the multi-block partition, and for each such candidate breakpoint for blocks of the multi-block partition, determining the sum of respective weighted sums for the respective blocks of the multi-block partition, each weighted sum being for a respective one of the blocks of the multi-block partition, and being, for a candidate breakpoint, equal to the weighted sum of the number of events in the low frequency region of the particular block, the weighting for the number of clusters having a particular cluster length being by an amount proportional the particular cluster length, wherein each candidate breakpoint determined in (c) is one of the candidate breakpoints of the sets of breakpoints determined in (b) for the respective ordered sequences of the blocks of the multi-block partition, and applied as a soft breakpoint when determining the weighted sums for the blocks in the multi-block partition;

(d) comparing the respective sums of the weighted sums using the respective candidate breakpoints determined in (c), and selecting as the single breakpoint for the multi-block partition the one candidate breakpoint of the set determined in (c) that gives the maximum sum of weighted sums.

14. A method as recited in claim 13, further comprising:

encoding all the sequences of the multi-block partition, including, for each sequence, encoding a first portion of the sequence up to the selected single breakpoint using the selected low-frequency variable length coding method and encoding a second portion of the sequence from the first coefficient after the selected single breakpoint to the end of the sequence using the selected high-frequency variable length coding method, the one single breakpoint being used as a soft breakpoint for any sequence of a block of the multi-block partition.

15. A method as recited in claim 14, further comprising encoding the position of the selected single breakpoint.

16. A method as recited in claim 13, wherein the weighting for the number of clusters having a particular cluster length is by how much the cluster length exceeds a predefined value.

17. A method as recited in claim 13, wherein 0 is the most likely-to-occur amplitude such that position events for the selected low-frequency variable length coding method include a cluster of one or more non-zero-valued quantized coefficients.

18. A non-transitory computer-readable medium having instructions encoded thereon that when executed by one or more processors of a processors system cause a method to be carried out, the method comprising:

for an ordered sequence of quantized transform coefficients of a block of image data, the quantized transform coefficients having respective amplitudes including a most likely-to-occur amplitude and at least one other amplitude, and for a selected low-frequency variable length coding method that includes recognizing events that each includes a cluster of coefficients having respective amplitudes other than the most likely-to-occur amplitude, determining a set of candidate breakpoints, each candidate breakpoint being defined by an ending event location for position events recognized in using the selected low-frequency variable length coding method, any candidate breakpoints that defines a position after the start of the sequence being for a hybrid coding method that includes using the selected low-frequency coding method until the ending event, and using a selected high-frequency method to encode a part of the sequence starting from immediately after the ending event;

for each candidate breakpoint, determining a weighted sum of the number of clusters of coefficients with other than the most likely-to-occur amplitude having each cluster length possible for the candidate breakpoint, the weighted sum using, for the number of clusters having a particular cluster length, a weighting that is an amount proportional the particular cluster length;

selecting as the breakpoint to use a candidate breakpoint that maximizes the weighted sum of numbers of clusters of each cluster length;

encoding the sequence including encoding a first portion of the sequence up to and including the final ending event defined by the selected breakpoint using the selected low-frequency variable length coding method and encoding a second portion of the sequence from the first coefficient after the final ending event to the end of the sequence using the selected high-frequency variable length coding method.

19. A non-transitory computer-readable medium having instructions encoded thereon that when executed by one or more processors of a processors system cause a method to be carried out, the method comprising:

determining a breakpoint for hybrid variable length coding an ordered sequence of quantized transform coefficients of a block, or for hybrid variable length coding ordered sequences of a multi-block partition, the breakpoint determining using a relationship to properties of blocks that neighbor the block or multi-block partition, wherein the breakpoint is defined by an ending event location for position events recognized in using a selected low-frequency variable length coding method, wherein hybrid variable length coding a sequence includes encoding a first portion of the sequence up to and including the final ending event defined by the breakpoint using the selected low-frequency variable length coding method and encoding a second portion of the sequence from the first coefficient after the final ending event to the end of the sequence using a selected high-frequency variable length coding method;

encoding the ordered sequence of quantized transform coefficients of the block, or the ordered sequences of the ordered sequences of the multi-block partition, the encoding using hybrid variable length coding using the determined breakpoint, wherein the determined breakpoint is encoded jointly with position events as an indication in the encoding of the position events in the selected low-frequency variable length coding method of whether or not to switch from the selected low-frequency coding method to the selected high-frequency variable length coding method.

20. A non-transitory computer-readable medium having instructions encoded thereon that when executed by one or more processors of a processors system cause a method to be carried out, the method comprising:

(a) for each ordered sequence of quantized transform coefficients of a block of image data in a multi-block partition, the quantized transform coefficients having respective amplitudes including a most likely-to-occur amplitude and at least one other amplitude, and for a selected low-frequency variable length coding method that includes recognizing events that each includes a cluster of coefficients having respective amplitudes other than the most likely-to-occur amplitude, determining a respective set of candidate breakpoints, each candidate breakpoint being defined by an ending event location for position events recognized in using the selected low-frequency variable length coding method, any candidate breakpoints that defines a position after the start of the respective sequence being for a hybrid coding method that includes using the selected low-frequency coding method until the ending event, and using a selected high-frequency method to encode a part of the sequence starting from immediately after the ending event;

(b) for each candidate breakpoint determined in (a), determining a weighted sum of the number of clusters of coefficients with other than the most likely-to-occur amplitude having each cluster length possible for the candidate breakpoint for the respective sequence in the multi-block partition, the weighted sum using, for the number of clusters having a particular cluster length, a weighting that is an amount proportional the particular cluster length;

(c) for the plurality of the blocks in the multi-block partition, determining a set of candidate breakpoints to use for all blocks of the multi-block partition, and for each such candidate breakpoint for blocks of the multi-block partition, determining the sum of respective weighted sums for the respective blocks of the multi-block partition, each weighted sum being for a respective one of the blocks of the multi-block partition, and being, for a candidate breakpoint, equal to the weighted sum of the number of events in the low frequency region of the particular block, the weighting for the number of clusters having a particular cluster length being by an amount proportional the particular cluster length, wherein each candidate breakpoint determined in (c) is one of the candidate breakpoints of the sets of breakpoints determined in (b) for the respective ordered sequences of the blocks of the multi-block partition, and applied as a soft breakpoint when determining the weighted sums for the blocks in the multi-block partition;

(d) comparing the sum respective sums of the weighted sums using the respective candidate breakpoints determined in (c), and selecting as the single breakpoint for the multi-block partition the one candidate breakpoint of the set determined in (c) that gives the maximum sum of weighted sums.

encoding all the sequences of the multi-block partition, including, for each sequence, encoding a first portion of the sequence up to the selected single breakpoint using the selected low-frequency variable length coding method and encoding a second portion of the sequence from the first coefficient after the selected single breakpoint to the end of the sequence using the selected high-frequency variable length coding method, the one single breakpoint being used as a soft breakpoint for any sequence of a block of the multi-block partition; and encoding the position of the selected single breakpoint.

* * * * *

UNITED STATES PATENT AND TRADEMARK OFFICE
CERTIFICATE OF CORRECTION

| | |
|---|---|
| PATENT NO. | : 8,121,427 B2 |
| APPLICATION NO. | : 11/961795 |
| DATED | : February 21, 2012 |
| INVENTOR(S) | : Tian et al. |

Page 1 of 1

It is certified that error appears in the above-identified patent and that said Letters Patent is hereby corrected as shown below:

In Column 32, line 36, after "comparing the", kindly delete "sum".

Signed and Sealed this
Seventeenth Day of April, 2012

David J. Kappos
*Director of the United States Patent and Trademark Office*